US012631833B2

(12) United States Patent
Ma

(10) Patent No.: US 12,631,833 B2
(45) Date of Patent: May 19, 2026

(54) FIBER OPTIC CONNECTION SYSTEM AND FIBER OPTIC CONNECTOR

(71) Applicant: Senko Advanced Components, Inc., Hudson, MA (US)

(72) Inventor: Siu Kei Ma, Kowloon (HK)

(73) Assignee: Senko Advanced Components, Inc., Hudson, MA (US)

( * ) Notice: Subject to any disclaimer, the term of this patent is extended or adjusted under 35 U.S.C. 154(b) by 401 days.

(21) Appl. No.: 18/179,864

(22) Filed: Mar. 7, 2023

(65) Prior Publication Data

US 2023/0288649 A1     Sep. 14, 2023

Related U.S. Application Data

(60) Provisional application No. 63/318,390, filed on Mar. 9, 2022.

(51) Int. Cl.
G02B 6/38          (2006.01)
(52) U.S. Cl.
CPC .........  G02B 6/3893 (2013.01); G02B 6/3825 (2013.01); G02B 6/3849 (2013.01)
(58) Field of Classification Search
CPC ....................................................... G02B 6/38
USPC ........................................................... 385/53
See application file for complete search history.

(56) References Cited

U.S. PATENT DOCUMENTS

| | | | | |
|---|---|---|---|---|
| RE37,079 E | * | 3/2001 | Stephenson .......... | G02B 6/3888 |
| | | | | 385/139 |
| 11,726,269 B2 | * | 8/2023 | Wong ................... | G02B 6/3898 |
| | | | | 385/78 |

| | | | | |
|---|---|---|---|---|
| 2005/0135752 A1 | * | 6/2005 | Kiani ................... | G02B 6/3895 |
| | | | | 385/55 |
| 2009/0148102 A1 | * | 6/2009 | Lu ......................... | G02B 6/3893 |
| | | | | 385/60 |
| 2013/0323940 A1 | * | 12/2013 | Coffey ............... | H01R 13/6205 |
| | | | | 385/139 |
| 2018/0224610 A1 | * | 8/2018 | Pimentel .............. | G02B 6/3893 |
| 2021/0341694 A1 | * | 11/2021 | Takano ................ | G02B 6/3893 |

FOREIGN PATENT DOCUMENTS

| | | |
|---|---|---|
| WO | 2021203012 A1 | 10/2021 |
| WO | 2022226169 A1 | 10/2022 |

OTHER PUBLICATIONS

International Search Report and Written Opinion, International Application No. PCT/US2023/063912, dated Sep. 1, 2023.

* cited by examiner

*Primary Examiner* — Kaveh C Kianni

(57)          ABSTRACT

In a fiber optic connection system, an adapter has an expandable wall portion that snaps onto a connector and latches with a latch knob of the connector housing. A lock and an extractor are disposed on the connector housing. During insertion, the extractor is in a forward position as the connector housing is inserted into the adapter. The adapter moves the lock backward relative to the housing and extractor, toward an unlocking position, until the adapter snaps onto the latch knob. Then the lock returns to the locking position to lock the connector to the adapter. To extracts the connector, the extractor is pulled backward. This moves the lock backward to unlock the connector from the adapter. Further pulling unlatches the adapter from the latch knob by expanding the expandable wall portion and extracts the connector.

17 Claims, 47 Drawing Sheets

222'

222'

222'

222

222

280

214

322'

322'

322

322

314

FIBER OPTIC CONNECTION SYSTEM AND FIBER OPTIC CONNECTOR

CROSS-REFERENCE TO RELATED APPLICATION

This application claims priority to U.S. Provisional Patent Application No. 63/318,390, filed Mar. 9, 2022, which is hereby incorporated by reference in its entirety.

FIELD

This disclosure generally pertains to a fiber optic connection system, fiber optic connector, and fiber optic adapter, and more particularly, to an ingress-protected fiber optic connection system, fiber optic connector, and fiber optic adapter having a push-pull insertion and extraction mechanism.

BACKGROUND

Ingress-protected fiber optic connection systems are used in various environments where there is a possibility of moisture or contaminants affecting an optical connection. Ingress-protected fiber optic connection systems employ a connector and a mating adapter, and at least one of the components comprises a seal configured to seal the interface between the connector and adapter when the components are mated. Conventional ingress-protected components having a coupling nut (bayonet-style or threaded) on either the connector or the adapter for locking the components together.

SUMMARY

In one aspect, a fiber optic connector comprises at least one fiber optic ferrule. A connector housing holds the at least one fiber optic ferrule. The connector housing comprises a latch knob. The fiber optic connector is configured to be inserted into an adapter whereby the fiber optic connector is configured to cause the adapter to snap onto the latch knob. A lock is disposed on the connector housing. The lock is movable in relation to the connector housing between a locking position and an unlocking position. The lock in the locking position is configured to lock the connector to the adapter. The lock in the unlocking position is configured to unlock the connector from the adapter. The lock is configured to be moved toward the unlocking position as the fiber optic connector is being inserted into the adapter. The lock is configured to return to the locking position when the adapter snaps onto the latch knob. An extractor is disposed on the connector housing. The extractor is movable in relation to the connector housing between a forward position and a backward position. The extractor in the forward position is configured such that the lock is movable in relation to the extractor to the unlocking position. The extractor is configured to be pulled from the forward position to the backward position to move the lock from the locked position to the unlocking position and thereby unlock the connector from the adapter and unlatch the adapter from the latch knob for extraction of the connector from the adapter.

In another aspect, a fiber optic adapter comprises a wall surrounding a port. The port has an open outer end through which a connector housing of a fiber optic connector is insertable into the port. The wall has an expandable outer portion proximate the open outer end of the port. The expandable outer portion of the wall is resiliently expandable. The wall defines a latch recess along the expandable outer portion. The fiber optic adapter is configured such that the connector housing enters the open outer end of the port and moves inward to a mating position. The expandable outer portion of the wall is configured to resiliently expand as the outer housing moves inward toward the mating position and to resiliently rebound when the connector housing arrives at the mating position such that the expandable outer portion snaps onto the connector housing and the latch recess latches with a latch knob of the connector housing. Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

Figure 1:
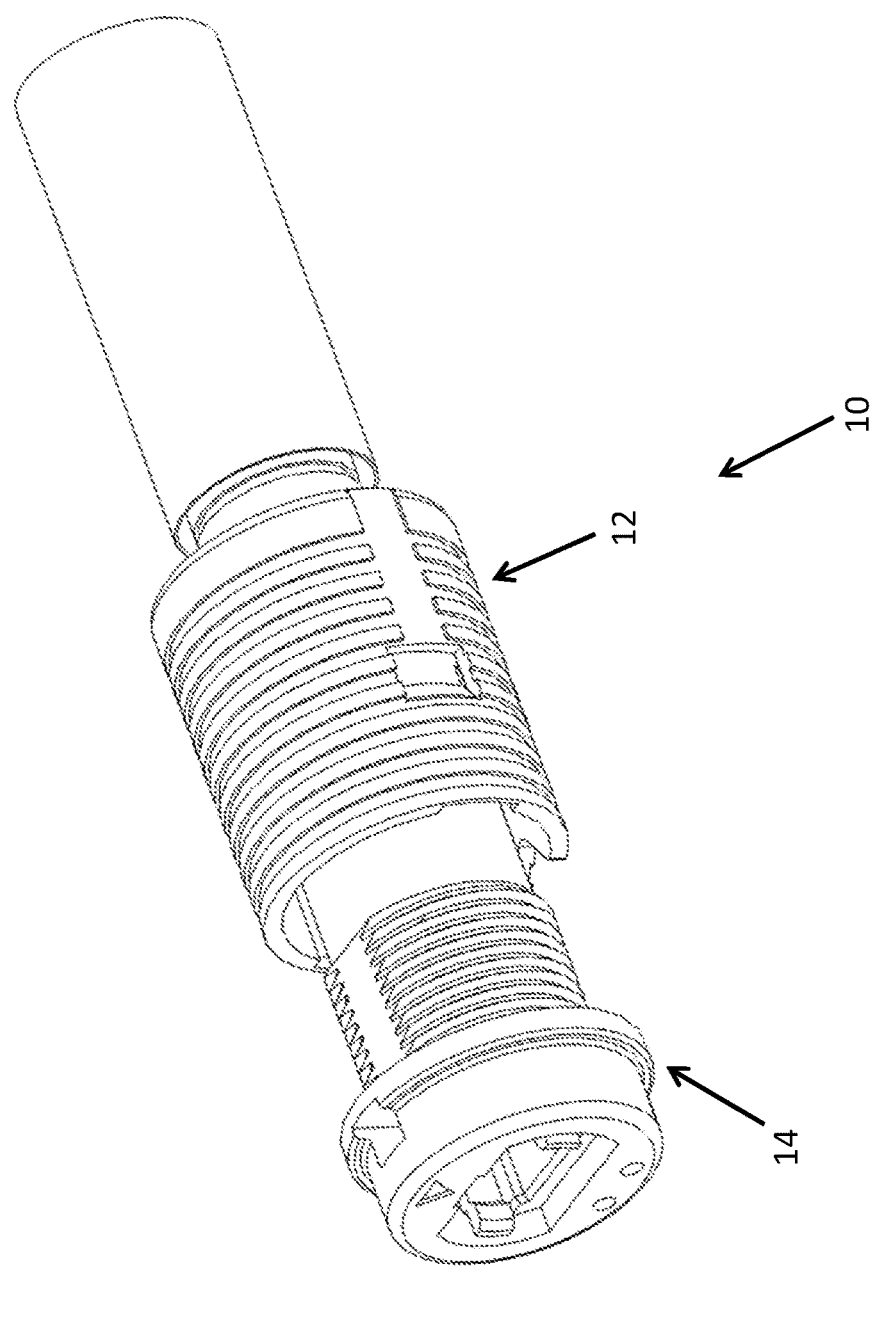
FIG. 1 is a perspective of a fiber optic connection system wherein a fiber optic adapter is mated to a fiber optic connector.
Figure 2:
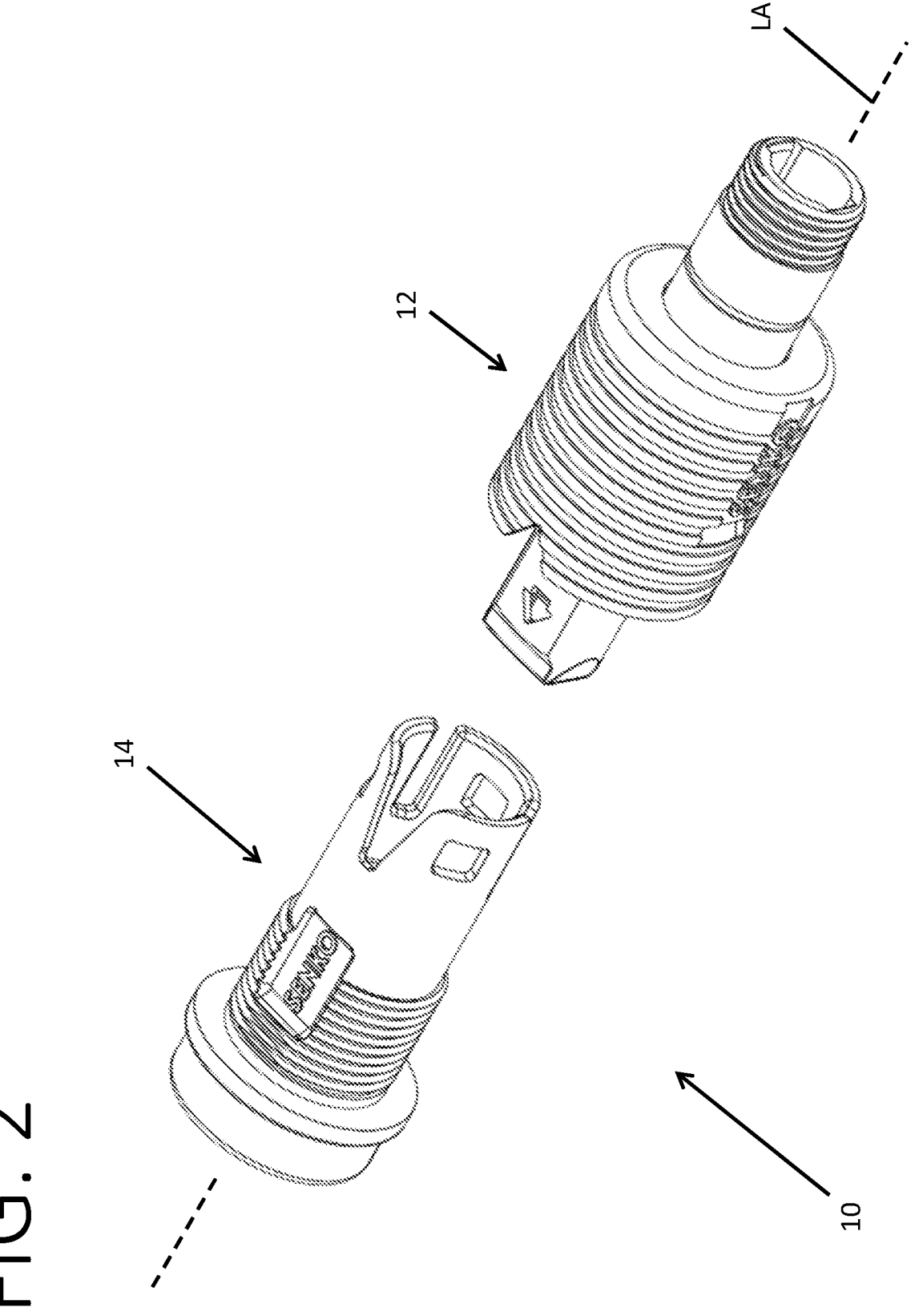
FIG. 2 is a perspective of the fiber optic connection system of FIG. 1 wherein the connector is unmated from the adapter.
Figure 3:
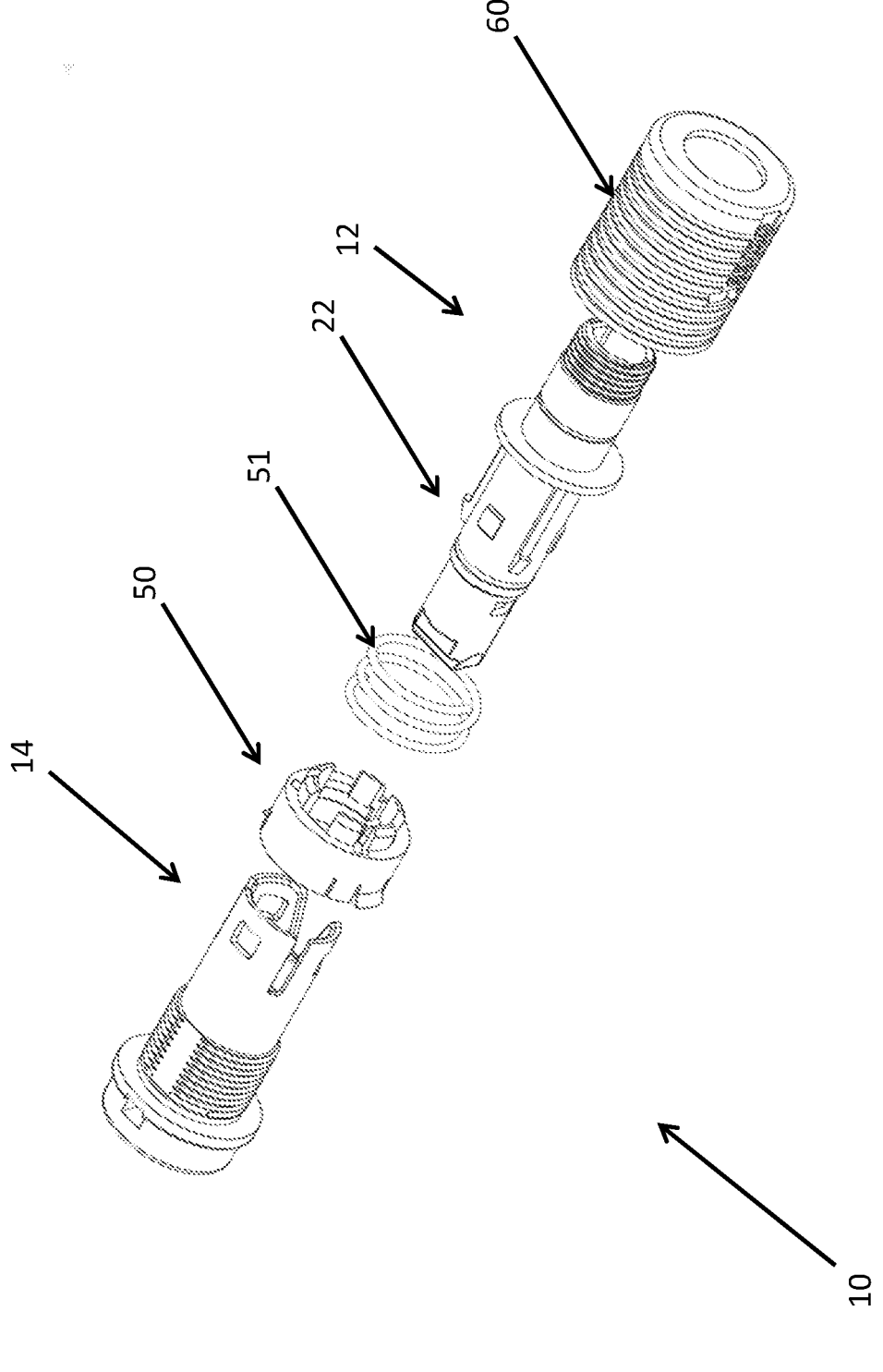
FIG. 3 is an exploded perspective of the fiber optic connection system.

Referring to FIGS. 1-3, an exemplary embodiment of a fiber optic connection system in the scope of this disclosure is generally indicated at reference number 10. The fiber optic connection system 10 broadly comprises a fiber optic connector 12 and a mating adapter 14. In the illustrated embodiment, the fiber optic connection system 10 is an ingress-protected fiber optic connection system. When the connector 12 is mated with the adapter 14, an ingress protection seal is made between the connector and the adapter to limit ingress of moisture or debris into the optical interface. Those skilled in the art will be aware that conventional ingress-protected fiber optic connection systems rely on coupling nuts (bayonet or threaded) to releasably lock the connector to the adapter. By contrast, the illustrated ingress protected connection system 10 is configured so that the connector releasably locks to the adapter by a more user-friendly push/pull mechanism. The connector 12 is plugged into the adapter 14 by axial movement along a longitudinal axis LA (FIG. 2). Without rotating any portion of either the adapter 14 or the connector 12, the connector locks with the adapter to retain the components in mated relation with one another. Conversely, to unlock and extract the connector 12 from the adapter 14, a user pulls an unlocking component of the connector backward along the longitudinal axis LA2. The connector 12 automatically unlocks from the adapter and is extracted without rotating any part of either the adapter or connector.

Figure 4:
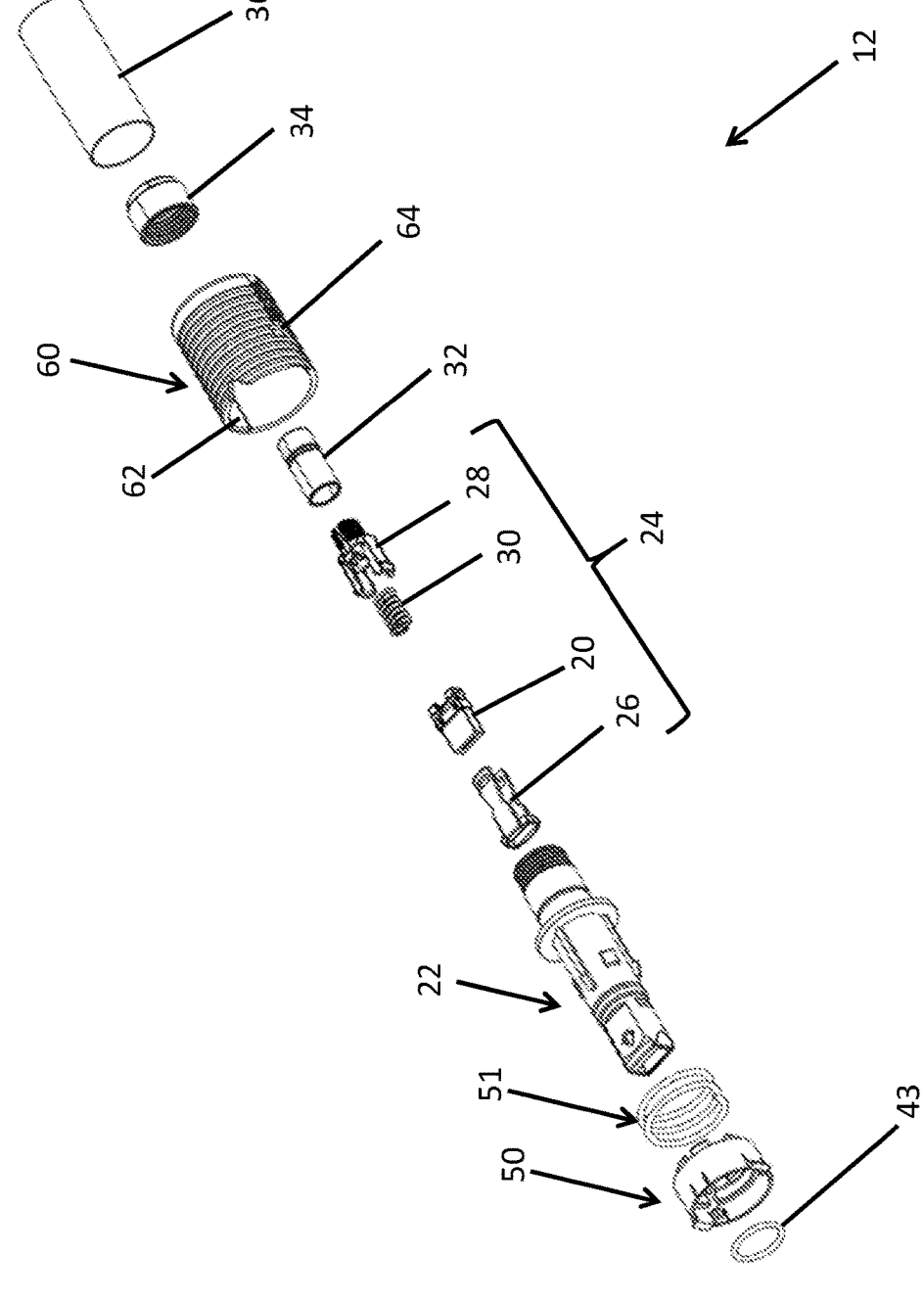
FIG. 4 is an exploded perspective of the connector.

Referring to FIG. 4. the fiber optic connector 12 generally comprises a fiber optic ferrule 20 and a connector housing 22 for holding the at least one fiber optic ferrule. In the illustrated embodiment, the connector 12 is a ruggedized MPO-style connector, so the ferrule 20 is a multifiber (MT) ferrule configured to terminate a plurality of optical fibers. The illustrated connector comprises a spring-loaded ferrule holder assembly 24 including the ferrule 20, a front body 26, a back body 28, and a ferrule spring 30. The front body 26 is configured to clip onto the back body 28 to hold the ferrule 20 and ferrule spring between the front body and the back body such that the ferrule spring yieldably biases the ferrule forward. The ferrule holder assembly 24 is configured to be inserted in the rear end of the connector housing 22, and the back body 28 is configured to latch with the connector housing to retain the ferrule holder assembly in the housing. The back body 28 comprises a back post. The connector 10 further comprises a crimp ring 32 configured to crimp the cable (e.g., cable strength members) onto the back post.

The connector 10 further comprises a rear coupling 34, 36 configured couple to the back end portion of the connector housing 22 to the fiber optic cable. Preferably the rear coupling is configured to seal the interface between the back end portion of the connector housing 22 and the cable. In one or more embodiments, the rear coupling comprises a coupling nut 34 configured to threadably connect to the back end portion of the connector housing 22 and grip the cable. In certain embodiments, the rear coupling comprises a heat shrink tube 36 configured to seal the interface between back end portion of the housing 22 and the cable.

Figure 5:
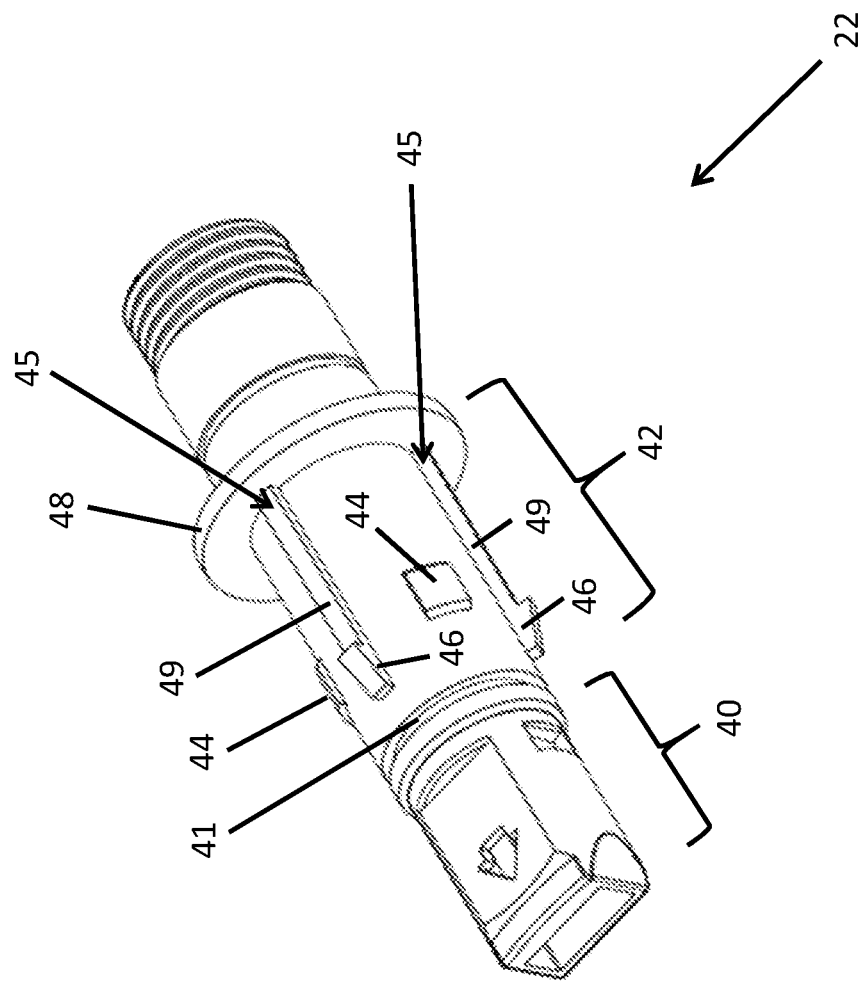
FIG. 5 is a perspective of a connector housing of the connector.

Referring to FIG. 5, the connector housing 22 comprises an open front end portion 40 configured to expose the ferrule 20 for making an optical connection. In the illustrated embodiment, the front end portion 40 of the connector housing 22 is similar in size and shape to the front end portion of the connector housing an MPO-style connector, available from the assignee of this invention. The front end portion 40 includes a groove 41 configured to receive an annular gasket 43 (FIG. 4). The annular gasket 43 is configured to sealingly engage the adapter 14 to make an ingress protection seal between the connector 12 and the adapter when the two components are mated.

Figure 6:
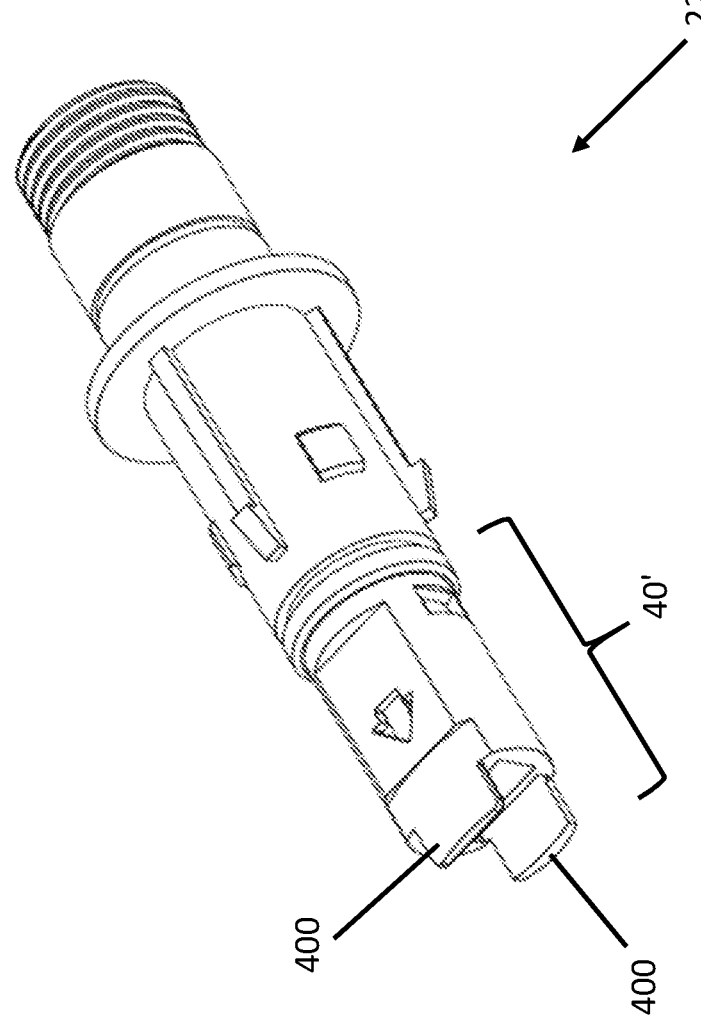
FIG. 6 is a perspective of a modified version of the connector housing including ferrule protection wings.
Figure 7:
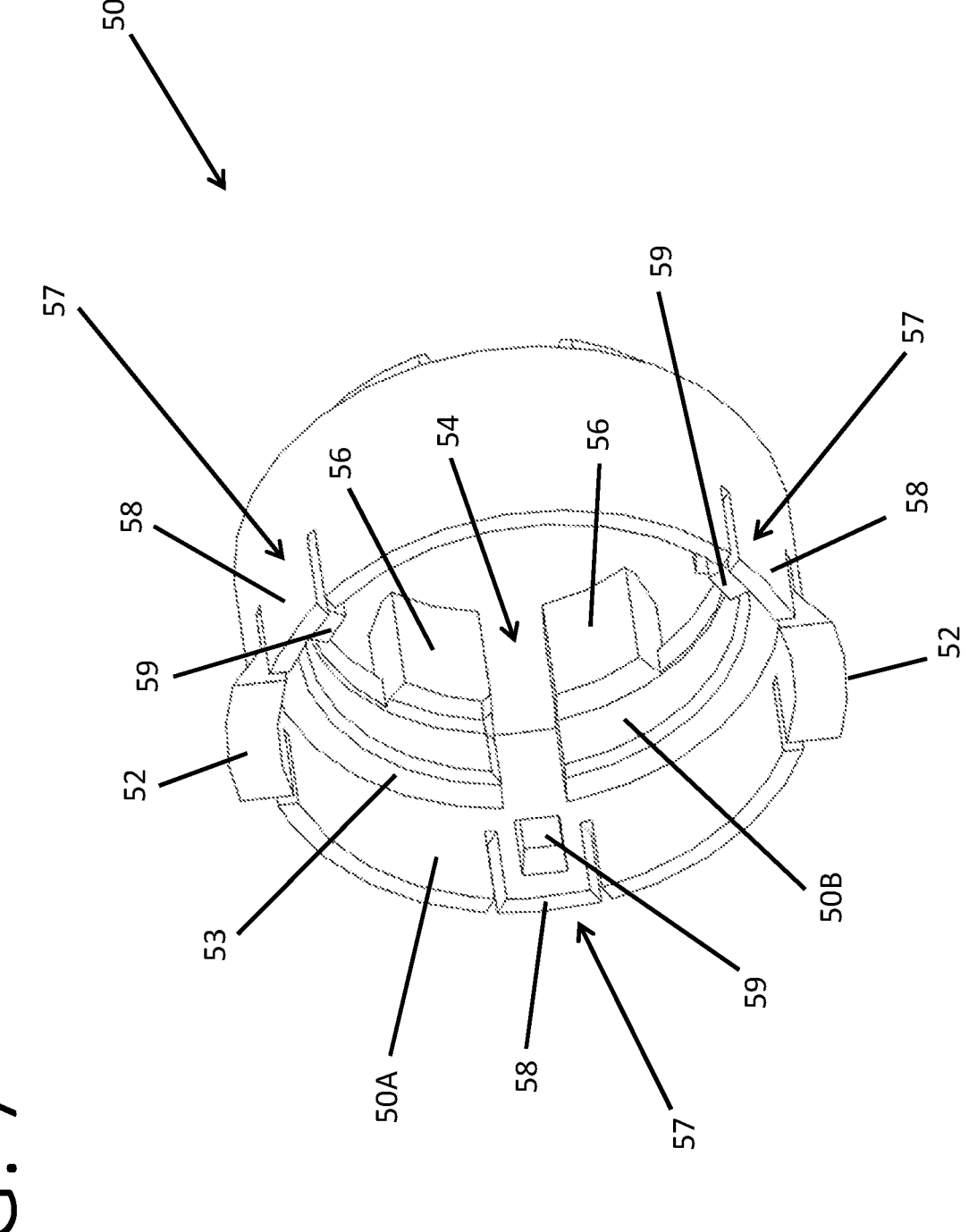
FIG. 7 is a perspective of a lock of the connector.
Figure 8:
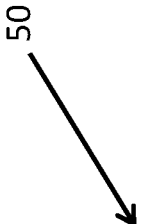
FIG. 8 is another perspective of the lock.
Figure 8:
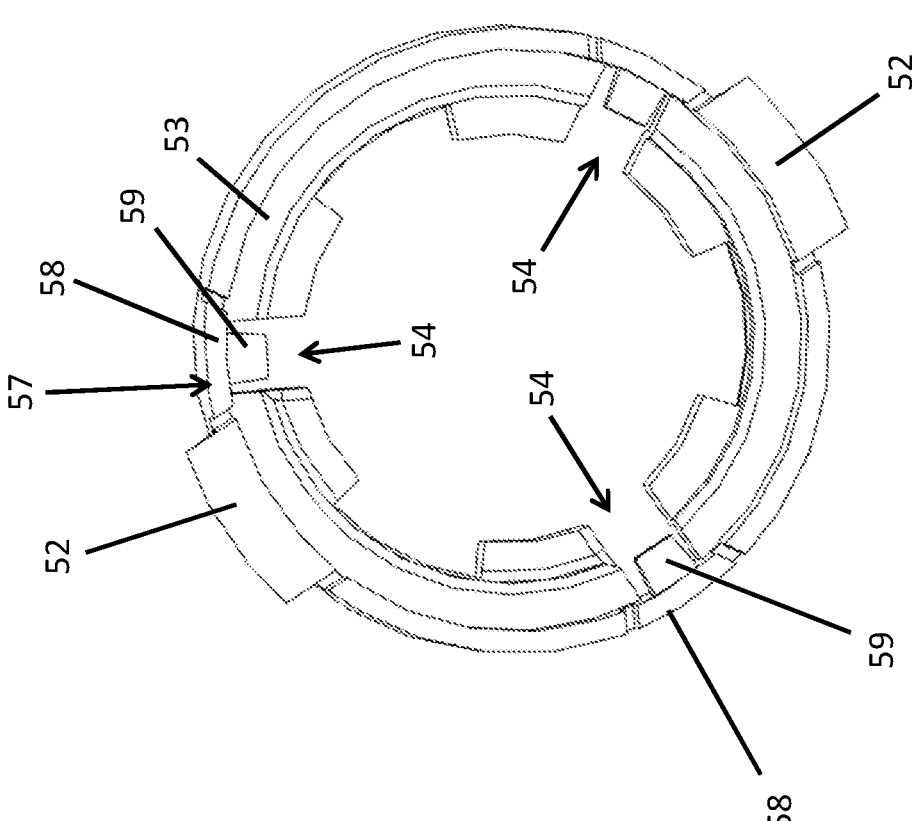
Figure 9:
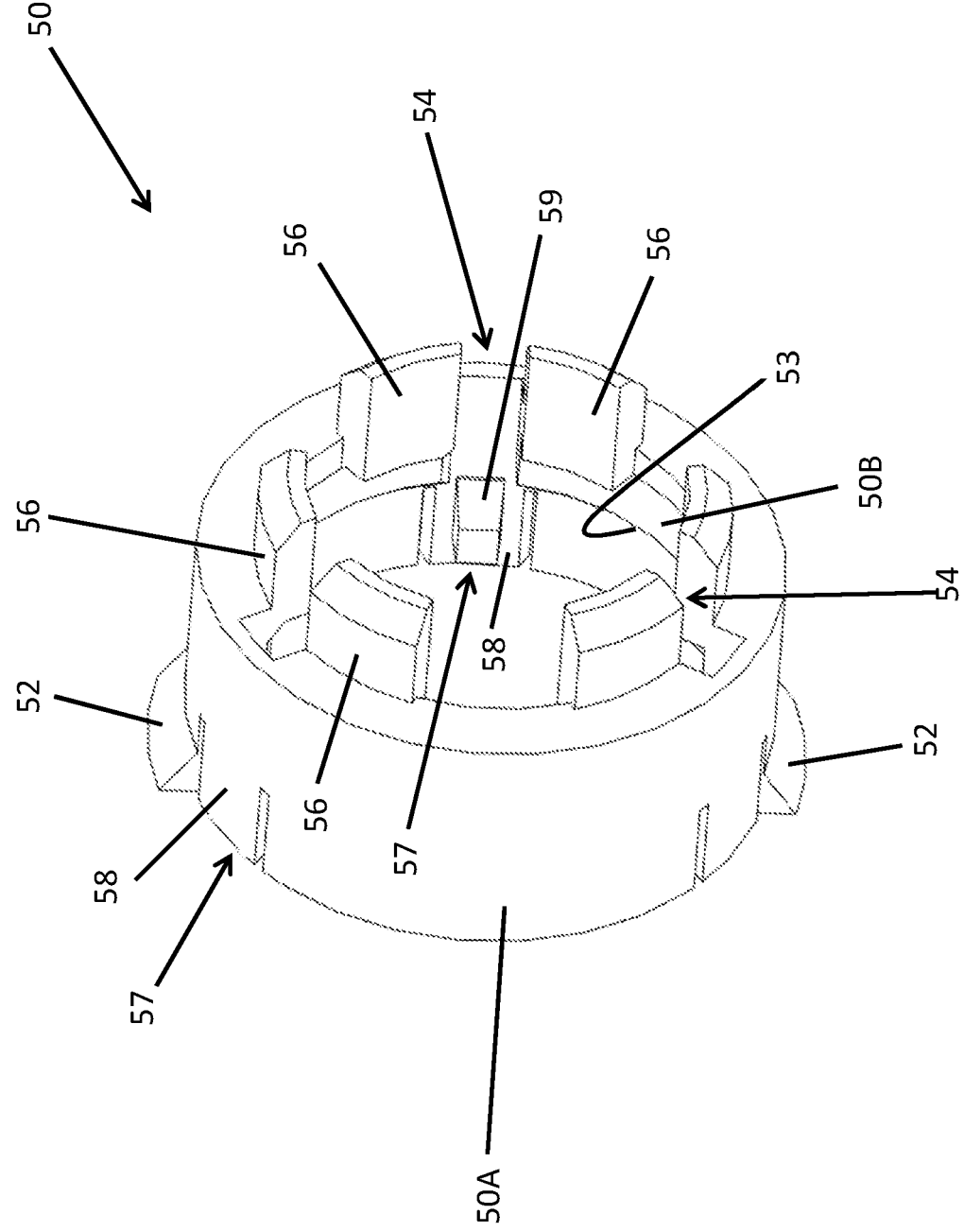
FIG. 9 is another perspective of the lock.
Figure 10:
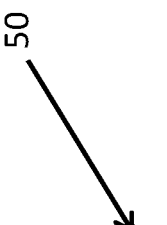
FIG. 10 is another perspective of the lock.
Figure 10:
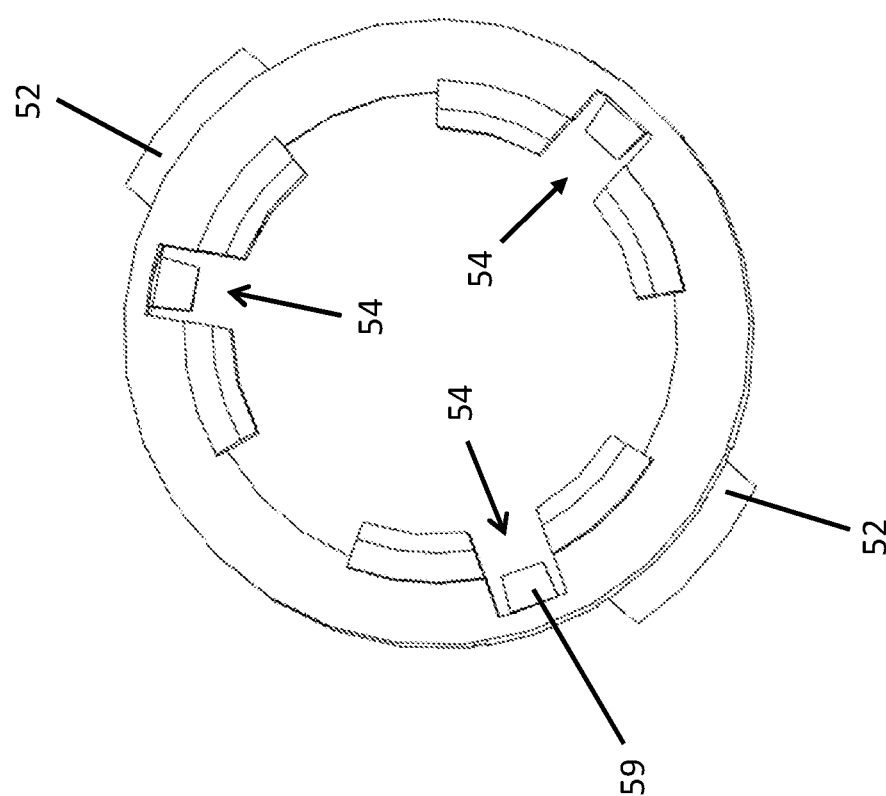
Figure 11:
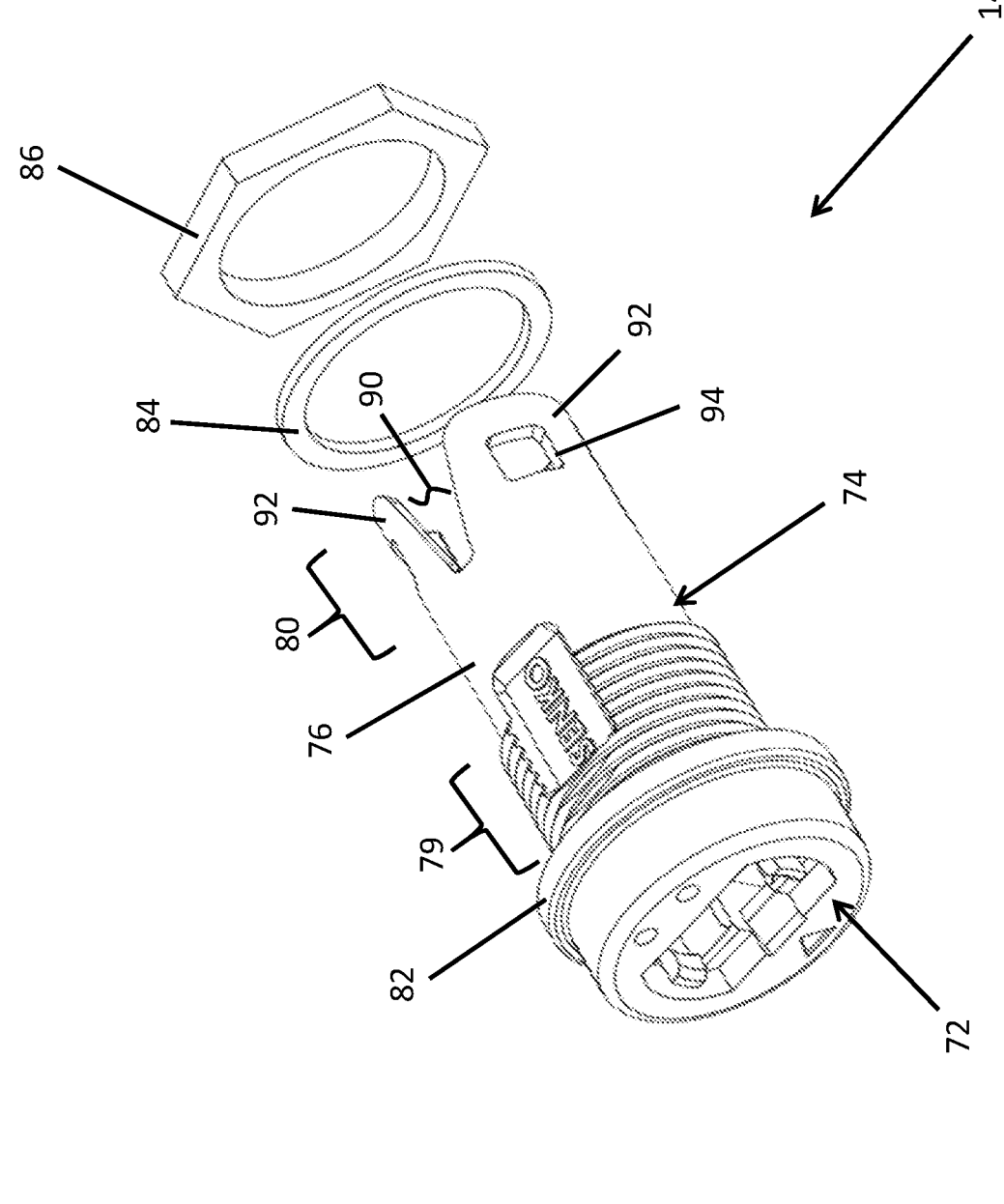
FIG. 11 is an exploded perspective of the connector.
Figure 12:
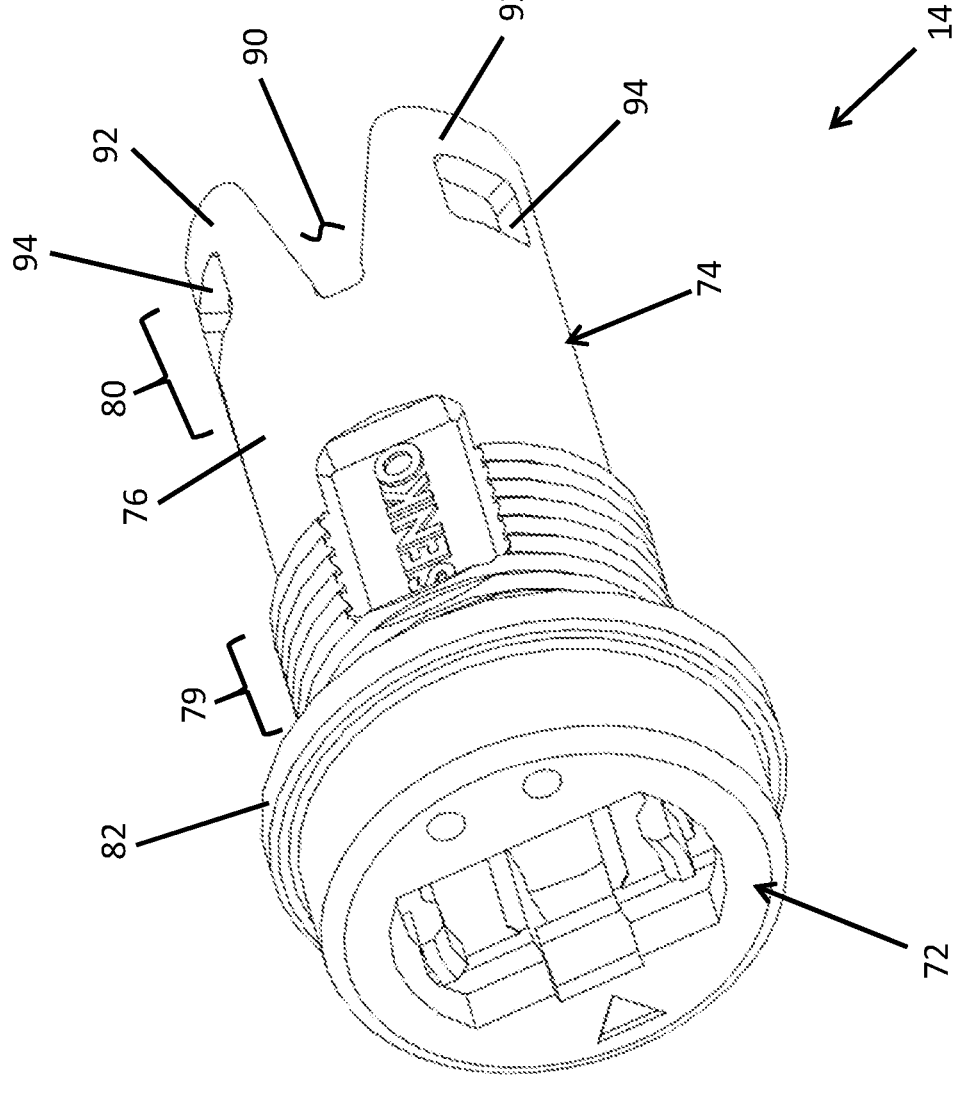
FIG. 12 is a perspective of the adapter.

Referring to FIG. 6, as is known to those skilled in the art, the front end portion 40' of the connector housing 22' can optionally be formed to include one or more forwardly projecting ferrule protection wings 400. The wings protrude forward past the front face of the ferrule to protect the ferrule from damage.

Referring again to FIG. 5, the connector housing 22 further comprises a latching portion 42 rearward of the front end portion. The latching portion 42 has at least one cross-sectional dimension greater than a corresponding cross sectional dimension of the front end portion 40. The latching portion 42 preferably comprises at least one latching feature 44 for latching with the adapter 14. In the illustrated embodiment the latching feature 44 is a latch knob. More particularly, the latching portion 42 comprises three (broadly, a plurality of) external latch knobs 44 at circumferentially spaced apart locations. As will be explained in further detail below, each latch knob 44 is configured to latch with a complementary latch feature of the adapter 14 when the connector 12 is mated to the adapter.

The latching portion 42 of the illustrated connector housing 22 further comprises features for operatively connecting a spring-loaded lock 50 (FIGS. 3 and 4) to the connector housing. The connector housing 22 comprises a lock spring flange 48 at the rear end of the latching portion 42 and a lock spring 51 is provided between the spring-loaded lock 50 and the lock spring flange 48(FIGS. 3 and 4). The lock spring flange 48 is configured to support the rear end of a lock spring 51 so that the lock spring yieldably biases the lock 50 forward on the connector housing 22. The latching portion 42 of the connector housing 22 further comprises one or more alignment ribs 45 extending forward from the lock spring flange 48. In the illustrated embodiment, the connector housing 22 comprises three (broadly, a plurality of) alignment ribs 45 circumferentially spaced apart about the connector housing 22. The alignment ribs 45 are interleaved between the latch knobs 44 about the perimeter of the connector housing 22. Each alignment rib 45 comprises a front lock hook 46. As will be explained more fully below, the lock hooks 46 are configured to retain the lock 50 on the connector housing 22. Between the lock spring flange 48 and the lock hooks 46, each alignment rib 45 comprises one or more elongate tongues 49. The tongues 49 broadly constitute tongue and groove features for slidably coupling the lock 50 to the connector housing 22 so that the lock can slide lengthwise on the housing in a limited range of motion but is restrained from rotating relative to the connector housing. The lock hooks 46 form stops at the front end of the range of motion of the lock 50 and the lock spring flange 48 forms a stop at the rear end of the range of motion. It will be understood that the tongues 49 could be replaced with grooves for establishing a sliding tongue and groove joint between the connector housing 22 and the lock 50.

Figure 14:
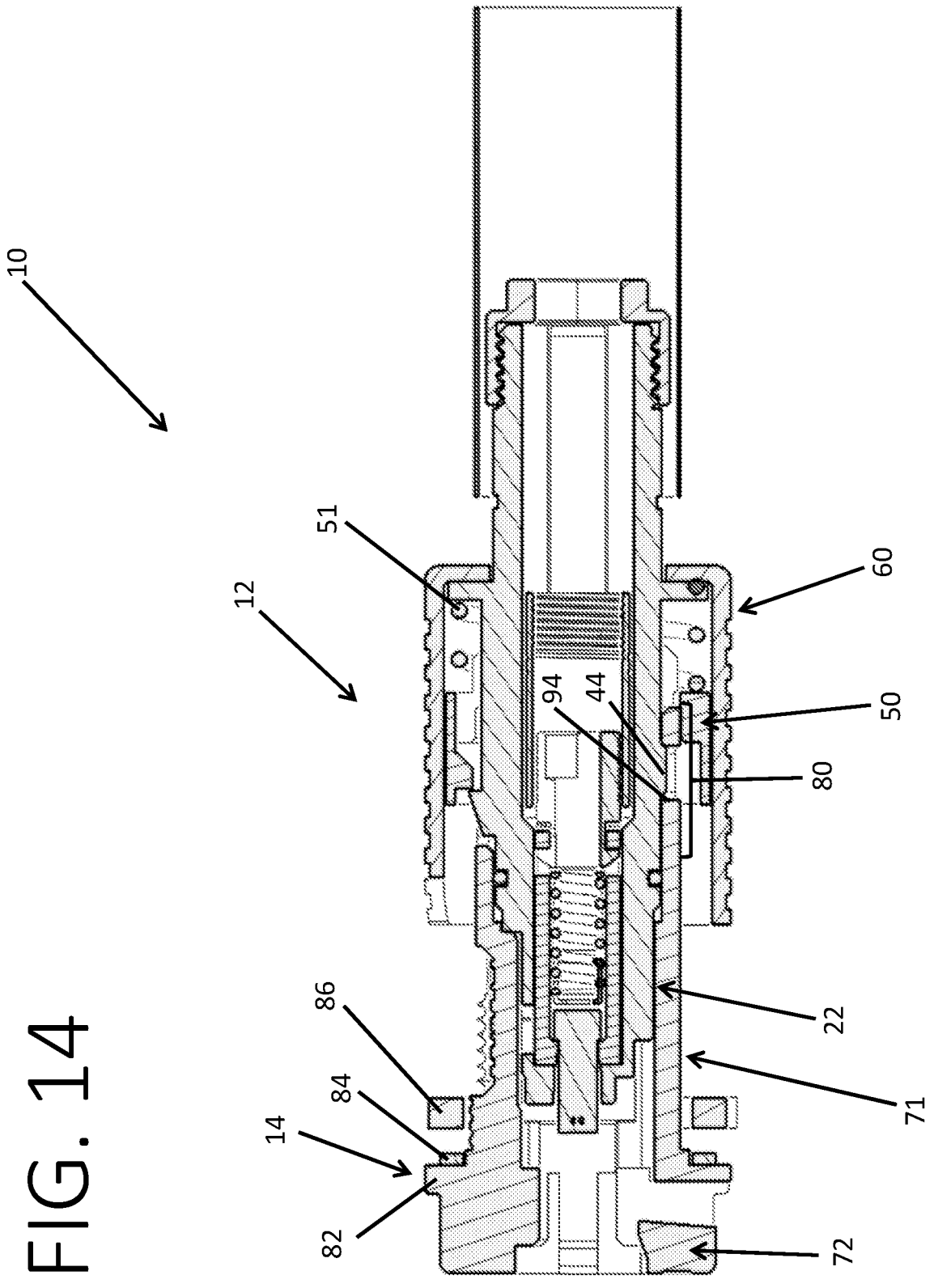
FIG. 14 is a cross section of the connection system as shown in FIG. 1.
Figure 23B:
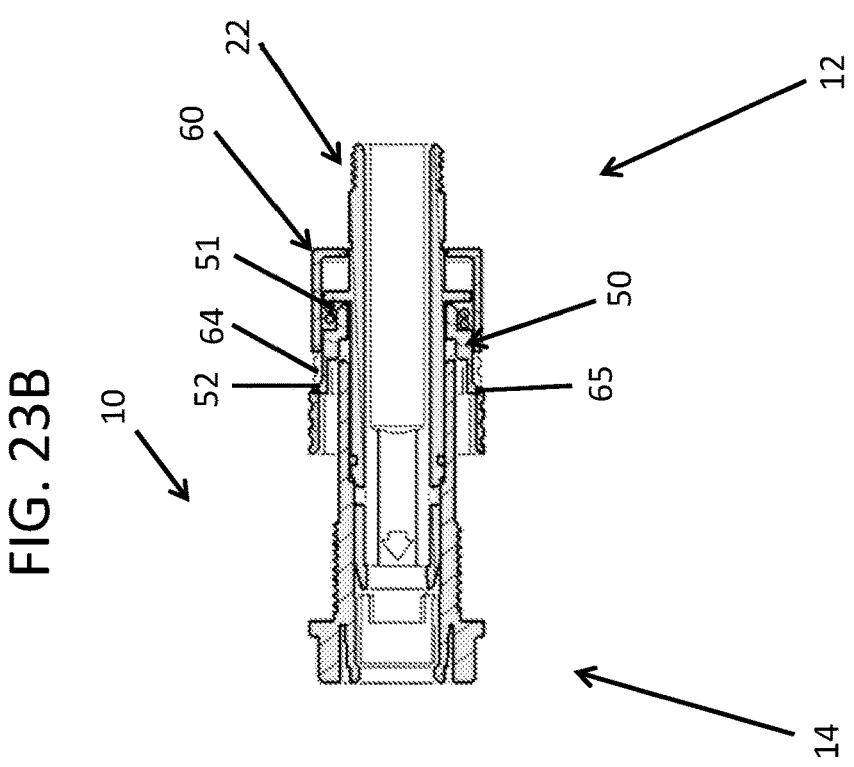
FIG. 23B is a cross section of the connection system in the configuration of FIG. 23A in the cross section plane of FIG. 15B.
Figure 23A:
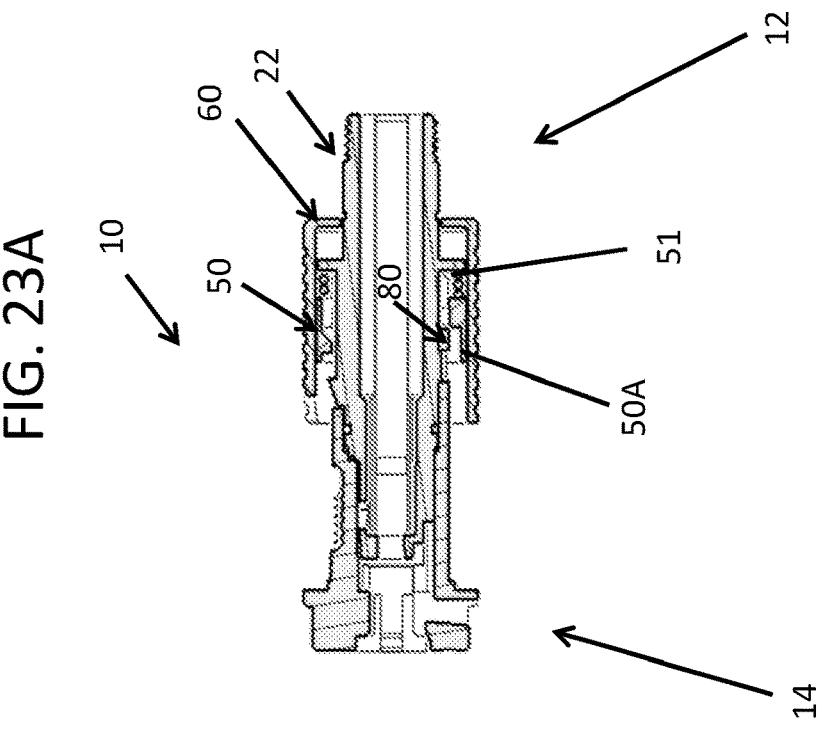
FIG. 23A is a cross section of the connection system as the connector is being withdrawn from the adapter in the same cross section plane as FIG. 15A.

The lock 50 is broadly configured for being movable in relation to the connector housing between a locking position (FIG. 14) and an unlocking position (FIGS. 23A, 23B). When the lock 50 is in the locking position and the connector 12 is mated with the adapter 14, the lock 50 is configured to lock the connector onto the adapter. When the lock 50 is in the unlocking position, the lock is configured to unlock the connector from the adapter to allow for extraction of the connector.

Referring to FIGS. 7-10, the illustrated lock 50 comprises a ring that is configured to be received on the latching portion 42 of the connector housing 22. The lock 50 comprises at least one outwardly projecting finger 52 configured to interface with an extractor 60 (FIG. 4) to facilitate selective unlocking of the lock as described in further detail below. In the illustrated embodiment, the lock 50 comprises first and second fingers 52 on diametrically opposite sides of the lock. Each lock finger 52 comprises a perpendicular front end and a slanted back end. In addition, each finger 52 is resiliently bendable radially inward in relation to the remainder of the lock 50. This allows the lock 50 to be loaded into the front end of the extractor 60, whereby the fingers 52 operatively connect to the extractor by snap fit.

The ring-shaped lock 50 has a front section 50A and a back section 50B. The front section 50A has greater inner cross-sectional dimensions than the back section. The lock 50 comprises a shoulder 53 between a larger front section 50A and smaller back section 50B. As explained more fully below, the inner shoulder 53 is configured to engage the adapter 14 to cause the lock 50 to temporarily move to the unlocking position during the plug-in sequence.

The lock 50 further comprises a tongue and groove feature 54 configured to slidably couple the lock to the connector housing 22. In the illustrated embodiment, the lock 50 comprises three (broadly, a plurality of) tongue and groove features 54 circumferentially spaced apart about the inner perimeter of the lock 50. The tongue and groove features are arranged so that each feature 54 slidably engages one of the tongues 49 of the connector housing. In the illustrated embodiment, each tongue and groove feature 54 comprises a groove partially located between a respective pair of inner back projections 56. The inner back projections 56 are configured to slidably engage the outer perimeter of the connector housing 22 on opposite sides of the respective tongue 49. In addition, the inner back projections 56 are configured to be received in the interior of the lock spring 51 to properly seat the lock spring on a back wall of the lock 50.

The lock 50 further comprises at least one housing hook 57. In the illustrated embodiment, the lock 50 comprises three (broadly, a plurality of) housing hooks 57 at the front end portion of the lock that are circumferentially aligned with the grooves 54. Each housing hook 57 comprises a tab 58 and a hook projection 59 projecting radially inward from the tab. Each tab 58 is resiliently bendable radially outward in relation to the remainder of the lock 50. Each lock hook 57 is configured so that the lock is loadable backward onto the housing 22. The grooves 54 receive the lock hooks 46 and tongues 49 to rotationally align the lock 50 with the connector housing 22. Eventually, the slanted back end of the hook projection 59 slides along the sloped front end of the lock hook 46, causing the housing hooks 57 to bend outward. The hook projections 59 then clear the lock hooks 46 and the tabs 58 resiliently rebound, snapping into latched relationship with lock hooks. In this position, the housing hooks 57 are configured to engage the lock hooks 46 to stop forward movement of the lock 50 in relation to the connector housing 22.

Referring to FIG. 3, the extractor 60 is configured to be disposed on the connector housing 22 such that the extractor is movable in relation to the housing between a forward position (FIG. 14) and a backward position (FIGS. 23A, 23B). The illustrated extractor 60 is generally cup-shaped. The extractor 60 comprises a back wall 61 that extends in a radial plane and an annular wall 62 that extends forward from the back wall. The back wall 61 defines a central opening 63 for receiving the back end portion of the connector housing 22. The extractor 60 is configured to be loaded forwardly onto the back end portion of the connector housing until the back wall 61 engages the lock spring flange 48, which stops forward movement of the extractor at the forward position.

Figure 22B:
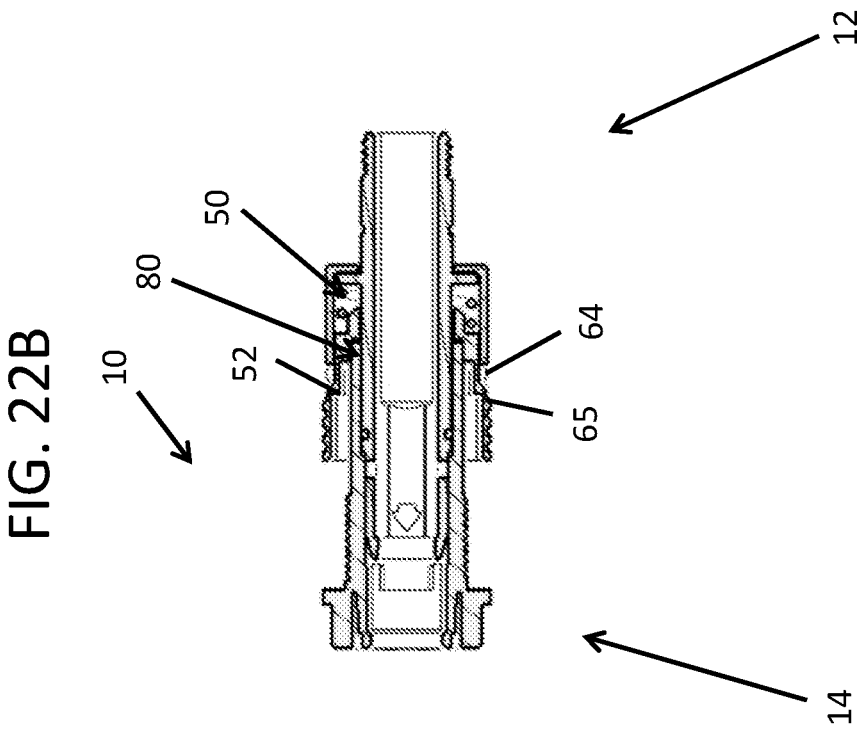
FIG. 22B is a cross section of the connection system in the configuration of FIG. 22A in the cross section plane of FIG. 15B.

The front end portion of the extractor 60 is open so that the lock 50 can be loaded backward into the extractor. The annular wall 62 of the extractor 60 comprises a slot 64 for each finger 52 of the lock 50. The annular wall 62 comprises an engagement surface 65 at the front end of each slot 64. When the lock 50 is loaded backward into the extractor 60, the fingers 52 snap into the slots 64. The engagement surfaces 65 then oppose the perpendicular front ends of the fingers 52 as shown in FIGS. 22B and 23B. Accordingly, when the extractor 60 moves from the forward position (FIG. 22B) to the backward position (FIG. 23B), the engagement surfaces 64 are configured to press backward on the fingers 52 and thereby displace the lock 50 rearward from the locking position to the unlocking position.

Figure 13:
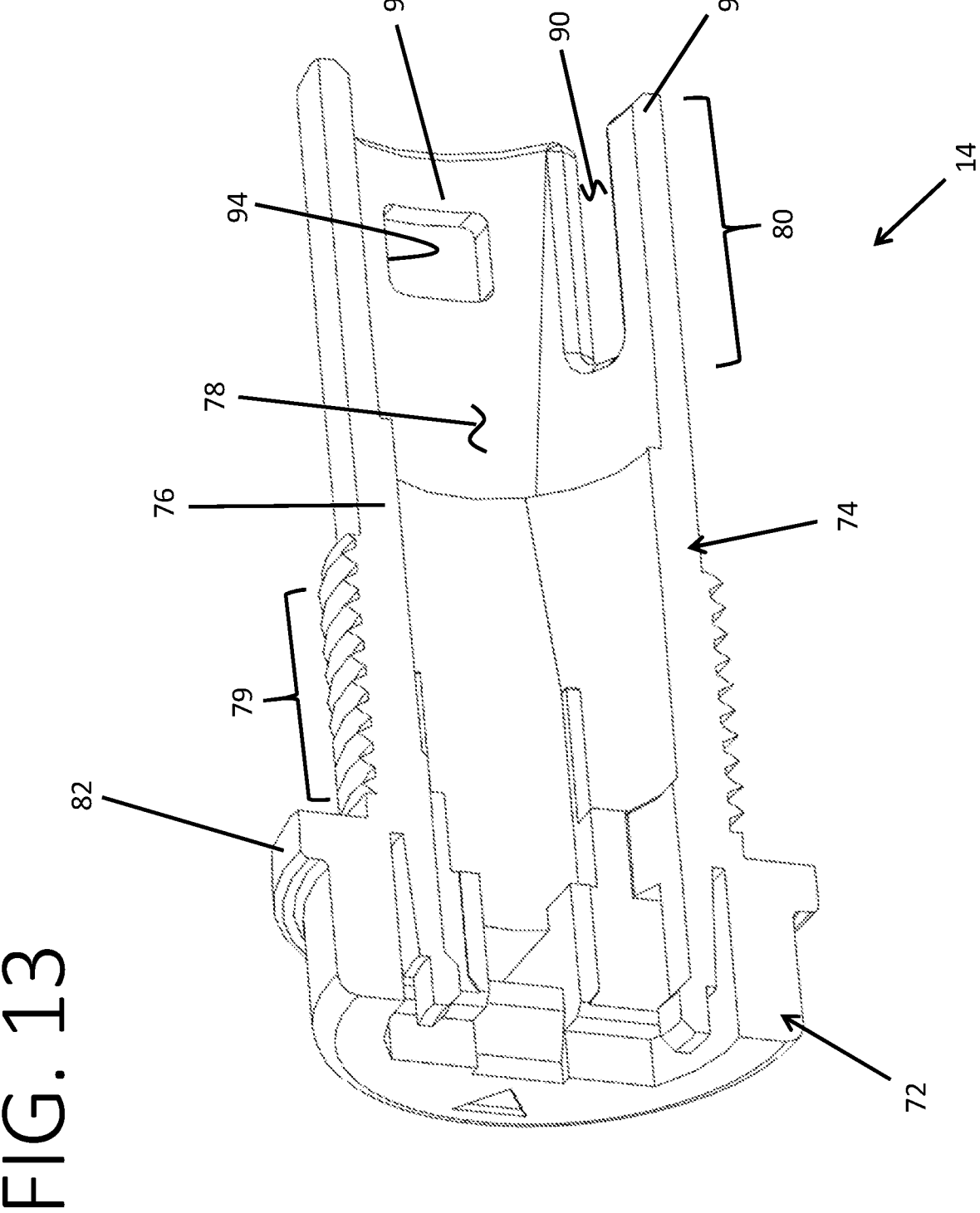
FIG. 13 is a cross-sectional perspective of the adapter.

Referring to FIGS. 11-14, the illustrated adapter 14 is a bulkhead adapter configured to mount on a bulkhead. The bulkhead adapter 14 comprises a non-rugged receptacle 72 configured to mate with a standard, non-ingress-protected connector (not shown) and a rugged receptacle 74 configured to mate with the ingress-protected connector 16. In the illustrated embodiment, the non-rugged receptacle 72 is an MPO receptacle configured to mate with a standard MPO connector. When an MPO connector is mated with the non-rugged receptacle 72 and the fiber optic connector 12 is mated with the rugged receptacle 74, an optical connection is made between the two connectors. The rugged receptacle 74 comprises a wall 76 defining a port 78 (FIG. 13). The wall 76 has an externally threaded inner end portion 79 and an expandable outer end portion 80. The wall 76 is configured to be inserted through an adapter opening in a bulkhead (not shown) until a flange 82 engages the bulkhead. The adapter 14 further comprises an annular gasket 84 and a coupling nut 86. The coupling nut 86 is configured to be threaded onto the inner end portion 79 of the wall 76 to compress the gasket 84 against the bulkhead. The coupling nut 86 thereby clamps the adapter 14 onto the bulkhead.

The port 78 has an open outer end through which the connector 12 is insertable into the adapter 14. The expandable outer portion 80 is proximate the open outer end of the port 86. In general, the expandable outer portion 80 of the wall 76 is configured to resiliently expand as the connector housing moves inward into the port 86 toward a mating position. When the connector 12 is fully plugged into the mating position, the expandable outer portion 80 resiliently rebounds such that the expandable outer portion snaps onto the connector housing 22 to latch with the latch knobs 44.

The expandable outer portion 80 comprises at least one expansion slot 90 and a bendable wall tab 92 on each side of the expansion slot. The illustrated adapter 14 comprises three expansion slots 90 (broadly, a plurality of expansion slots) that are circumferentially spaced apart about the expandable outer portion 80 and three flexible wall tabs 92 (broadly, a plurality of flexible wall tabs) interleaved between the expansion slots. The expansion slots 90 are shaped and arranged to slidably receive the alignment ribs 45 of the connector housing 22 therein as the connector 12 is mated with the adapter 14. In addition, the expansion slots 90 provide space and separation between the flexible wall tabs 92 to allow for radial expansion of the expandable outer portion 80. Each flexible wall tab 92 is resiliently bendable radially outward. During use, the latch knobs 44 are configured to bend the flexible wall tabs 92 radially outward from a natural position (FIGS. 16A and 16B) to an expanded position (FIGS. 17A and 17B) as the connector 12 is plugged into the adapter 14.

Each flexible wall tab 92 comprises a respective latch recess 94. The latch recesses 94 are shaped and arranged to latch with the latch knobs 44 when the connector 12 is mated with the adapter 14. In moving the connector 12 towards the adapter 14 to be mated with each other, each flexible wall tab 92 expands outward when it contacts with the respective latch knob. When the connector 12 is moved to the mating position and mated with the adapter 14, the latch recesses 94 receive the latch knobs 44, allowing the flexible wall tabs 92 return to their natural positions. This creates detent-type latching engagement between the latch knobs 44 and the latch recesses 94, but does not establish a lock of the connector to the adapter. To lock the connector 12 to the adapter 14 such that the connector is prevented from inadvertently disconnecting with the adapter, the lock 50 subsequently moves to the locking position as described more fully below. By 'detent-type latching' this disclosure means that, provide that the lock 50 is in the unlocking position, the latch recesses 94 will unlatch from the latch knobs 44 whenever sufficient pull-out force is imparted on the connector housing 22 to bend the bend wall tabs 92 outward to the expanded positions.

Figure 15B:
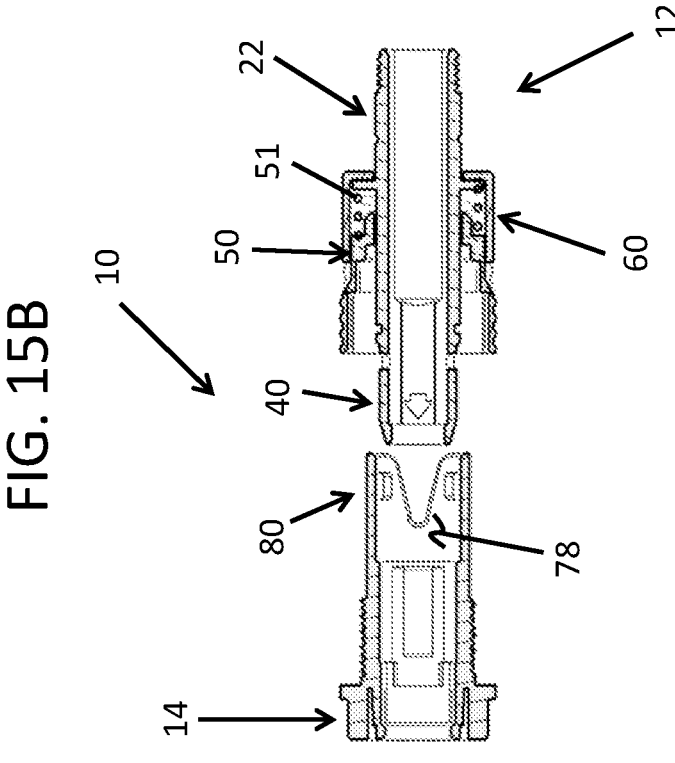
FIG. 15B is a cross section of the connection system as shown in FIG. 15A in a plane perpendicular to the cross section plane in FIG. 15A.
Figure 15A:
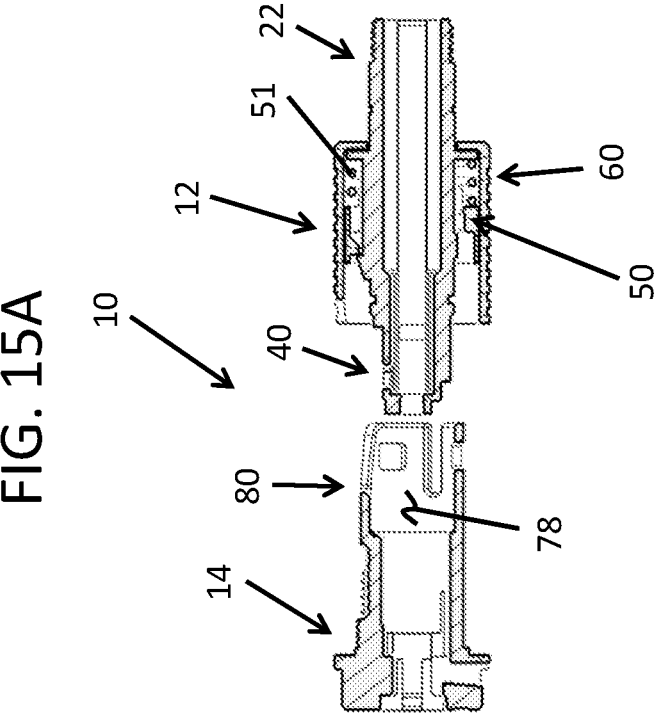
FIG. 15A is a cross section of the connection system as shown in FIG. 2 taken in the same plane as FIG. 14.

Having introduced the structural components of the connection system 10, an exemplary method of using the connection system will now be briefly described. FIGS. 15A-21B show an exemplary push-in process for mating an ingress-protected fiber optic connection using the connection system 10. FIGS. 15A-15B show the connector 12 and adapter 14 unmated. At this stage, the lock spring 51 biases the lock 50 to the locking position, which in turn biases the extractor to the forward position. The expandable outer portion 80 of the adapter 14 is in its natural, unexpanded position. To make an optical connection, a user grips the connector 12 by either the extractor 60 or the rear end portion of the connector housing 22 and pushes the connector forward the adapter so that the front end portion 40 of the connector housing enters the adapter port 78.

Figure 16B:
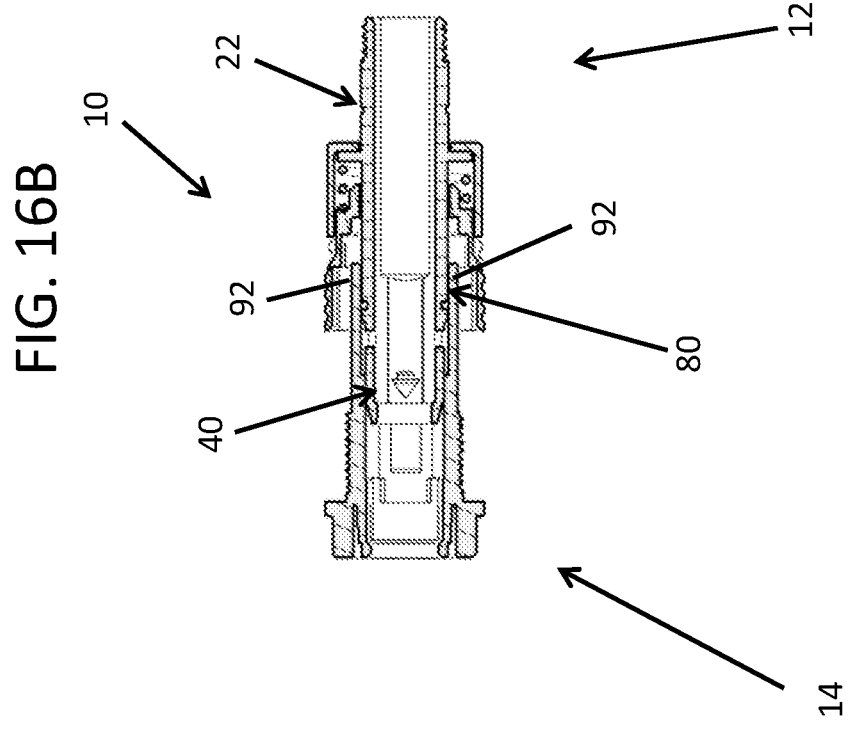
FIG. 16B is a cross section of the connection system in the configuration of FIG. 16A in the cross section plane of FIG. 15B.
Figure 16A:
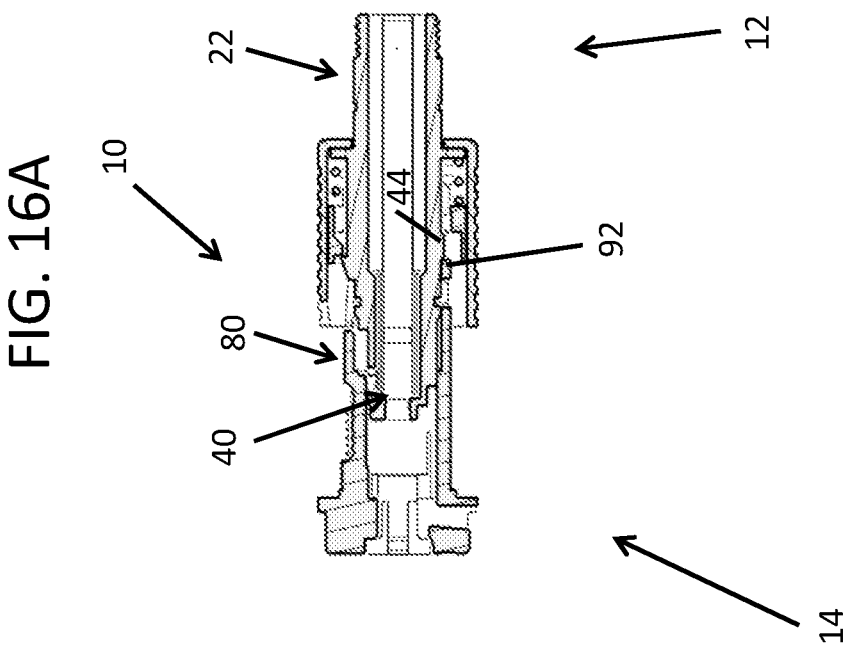
FIG. 16A is a cross section of the connection system as the connector is being inserted into the adapter in the same cross section plane as FIG. 15A.

In FIGS. 16A and 16B, the front end portion 40 of the connector housing 22 is received in the expandable outer portion 80 of the adapter 14. As mentioned above, the front end portion 40 has relatively small cross sectional dimensions, so it does not cause the outer portion 80 of the adapter 14 to expand.

Figure 17B:
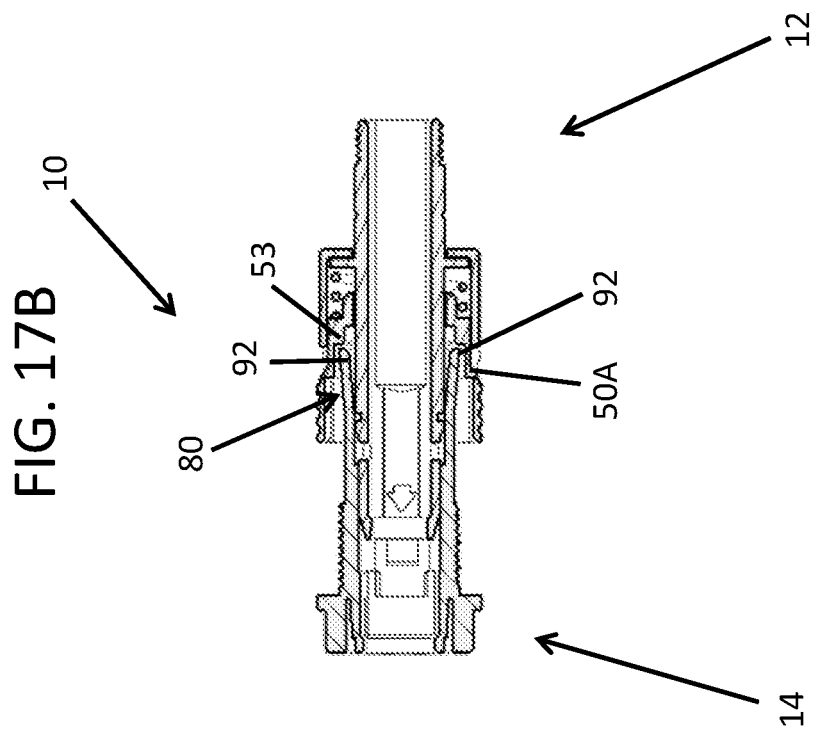
FIG. 17B is a cross section of the connection system in the configuration of FIG. 17A in the cross section plane of FIG. 15B.
Figure 17A:
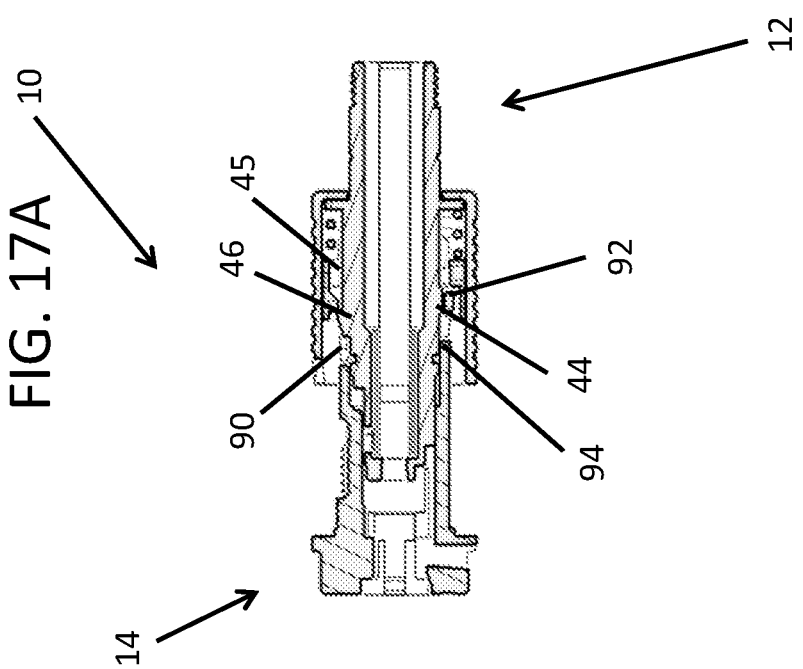
FIG. 17A is another cross section of the connection system as the connector is being inserted further into the adapter in the same cross section plane as FIG. 15A.

In FIGS. 17A and 17B, the connector 12 is inserted further forward. In this position the expansion slots 90 receive the lock hooks 46 of the alignment ribs 45 to rotationally align the connector 12 with the adapter 14. The latch knobs 44 also engage the flexible wall tabs 92 of the adapter 14 and push the flexible wall tabs outward, which expands the expandable outer portion 80 to its expanded position. At this stage, the flexible wall tabs 92 are in front of the inner shoulder 53 of the lock, overlapping the front section 50A of the lock 50. Because of the large internal cross-sectional dimensions of the front section 50A, the flexible wall tabs 92 have clearance to bend radially outward when the latch knobs 44 initially engage the tabs.

Figure 18B:
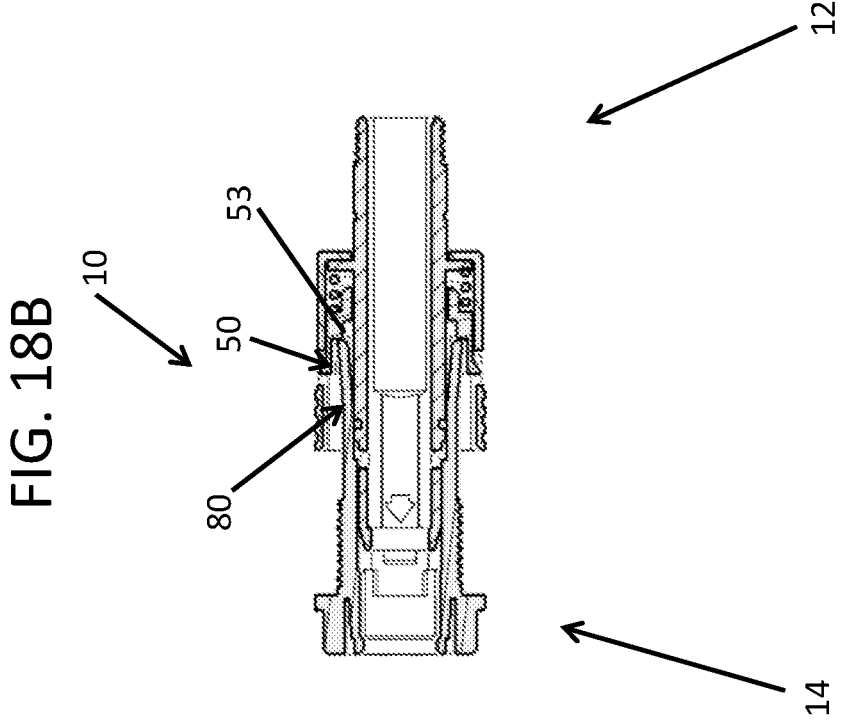
FIG. 18B is a cross section of the connection system in the configuration of FIG. 18A in the cross section plane of FIG. 15B.
Figure 18A:
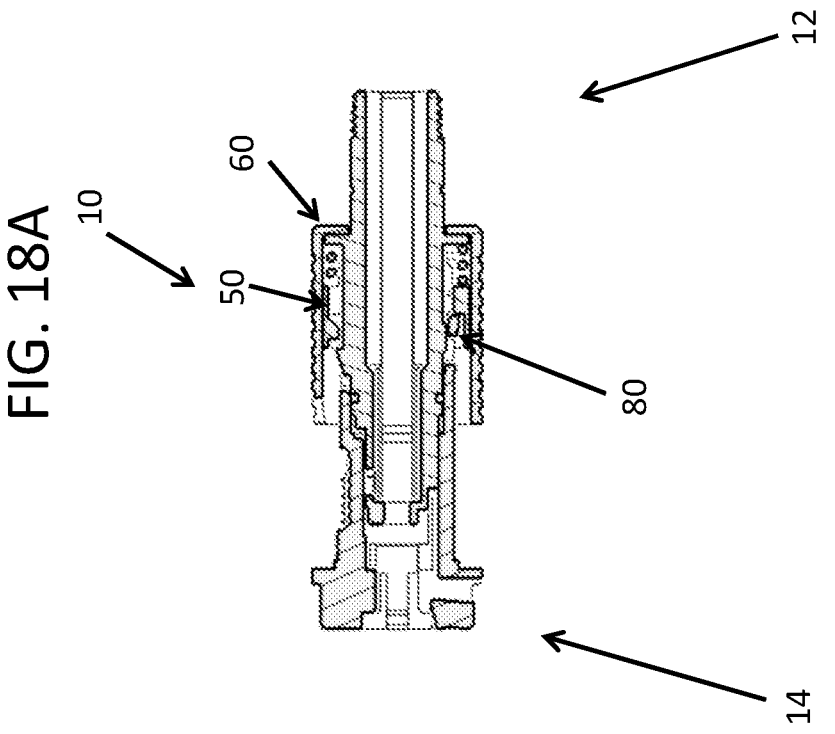
FIG. 18A is another cross section of the connection system as the connector is being inserted further into the adapter in the same cross section plane as FIG. 15A.
Figure 19B:
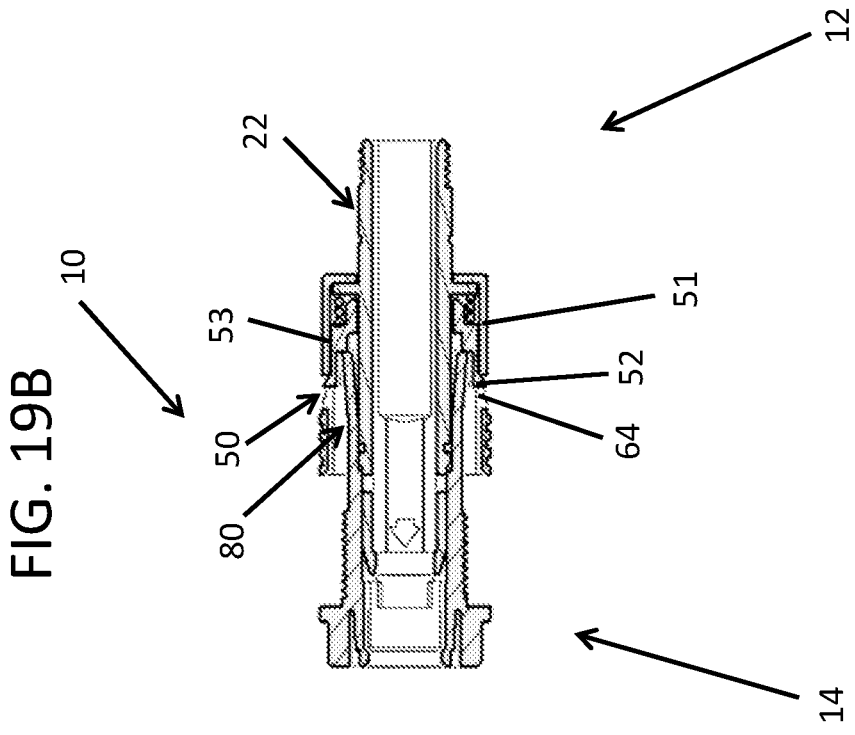
FIG. 19B is a cross section of the connection system in the configuration of FIG. 19A in the cross section plane of FIG. 15B.
Figure 19A:
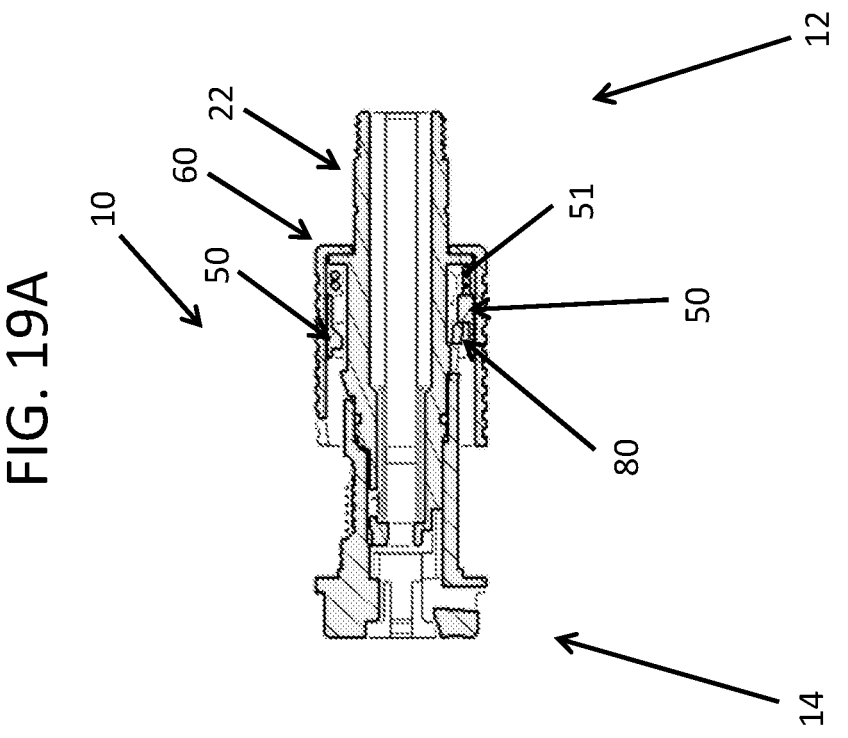
FIG. 19A is another cross section of the connection system as the connector is being inserted further into the adapter in the same cross section plane as FIG. 15A.

Referring to FIGS. 18A and 18B, further insertion of the connector 12 causes the expanded outer portion 80 of the adapter to engage the inner shoulder 53 of the lock 50 for pushing the lock rearward against the spring 51. In this state, the lock 50 moves with the tip of the adapter 14 in relation to the connector housing 22. As seen in FIGS. 19A-19B, with further insertion of the connector 12, the expanded outer portion 80 displaces the lock 50 to the unlocking position by pressing the shoulder 53 rearward. Movement of the lock 50 to the unlocking position loads the lock spring 51. The fingers 52 slide rearward in the slots 64 so that the lock 50 moves backward in relation to the extractor 60.

Figure 20B:
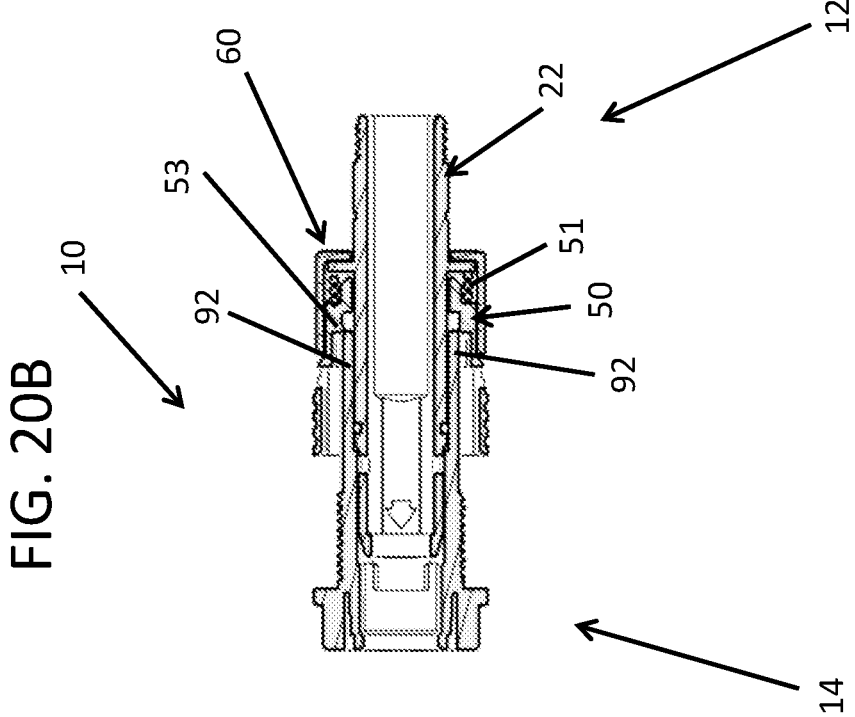
FIG. 20B is a cross section of the connection system in the configuration of FIG. 20A in the cross section plane of FIG. 15B.
Figure 20A:
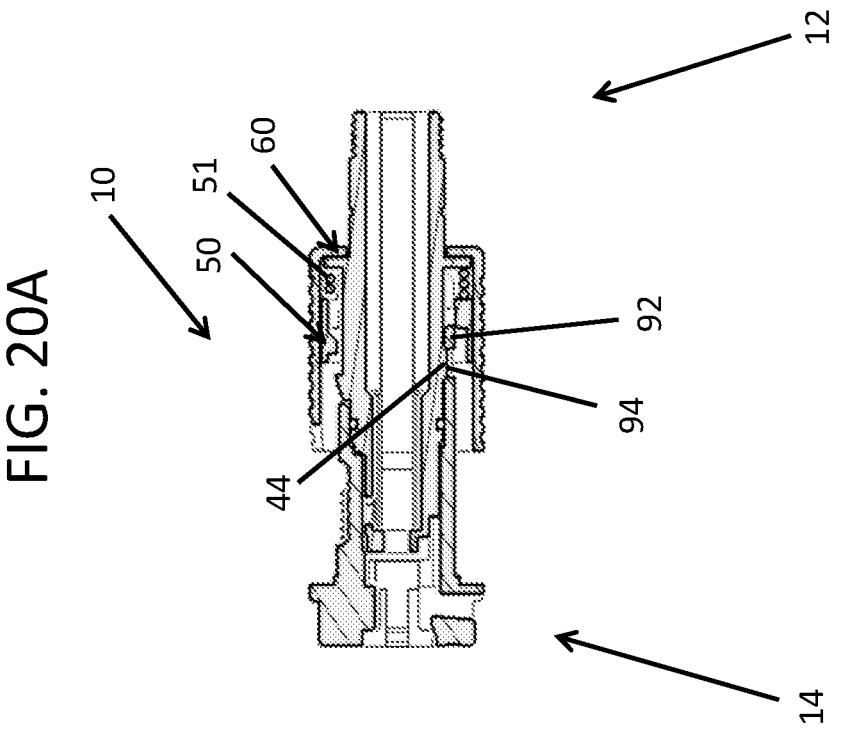
FIG. 20A is another cross section of the connection system as the connector is being inserted further into the adapter in the same cross section plane as FIG. 15A.
Figure 21B:
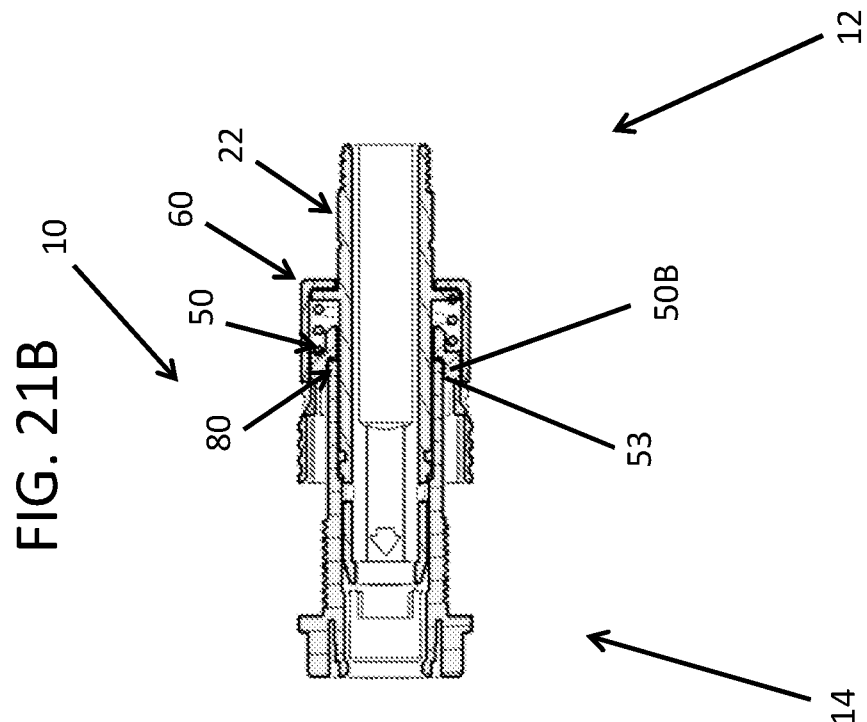
FIG. 21B is a cross section of the connection system in the configuration of FIG. 21A in the cross section plane of FIG. 15B.
Figure 21A:
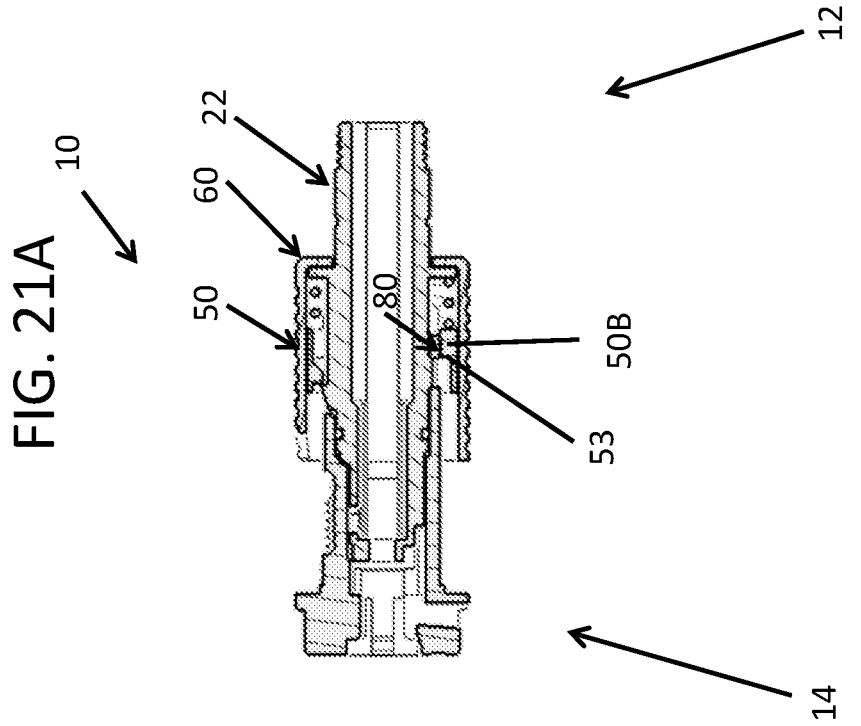
FIG. 21A is a cross section of the connection system fully inserted into the adapter in the same cross section plane as FIG. 15A.

Referring to FIGS. 20A and 20B, when the connector housing 12 reaches the mating position, e.g., the latch knobs 44 are aligned with the latch recesses 94, the flexible wall tabs 92 first snap back to their natural positions. This latches the latch recesses 94 of the adapter 14 to the latch knobs 44. It also disengages the expandable outer portion 80 of the adapter from the inner shoulder 53 of the lock 50 so that the lock 50 stops moving together with the tip of the adapter 14 and returns to the locking position under the force of the spring 51 as shown in FIGS. 21A and 21B. In this position the rear section 50B of the lock 50 overlaps the expandable outer portion 80 of the adapter, e.g., the rear section 50B surrounds the expandable outer portion 80. As a result, the lock 50 blocks the expandable outer portion 80 from expanding when the connector 12 is mated to the adapter 14. This locks the connector 12 to the adapter 14.

Figure 22A:
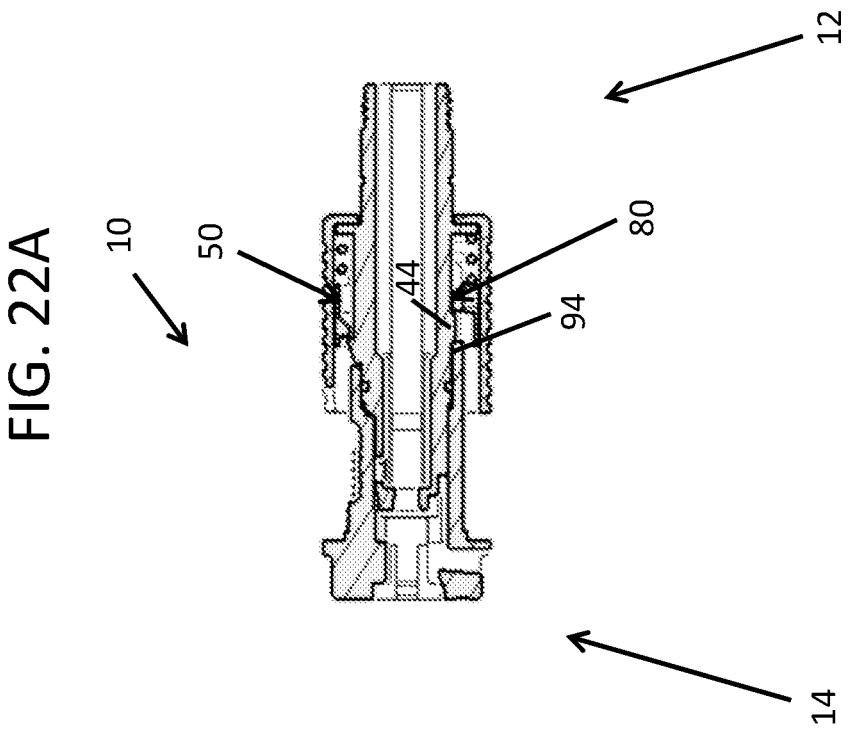
FIG. 22A is a cross section of the connection system fully inserted into the adapter in the same cross section plane as FIG. 15A.

Referring to FIGS. 22A and 22B, a method of extracting the connector 12 from the adapter 14 will now be briefly described. As shown in FIGS. 22A and 22B, when the connector 12 is mated to the adapter 14, the latch knobs 44 are latched with the latch recesses 94 and the lock 50 is in the locking position where it covers the expandable outer portion 80 of the adapter 14. In this position, the lock 50 locks the latch between the connector 12 and the adapter 14 because it prevents the expandable outer portion 80 separating from the latch knobs 44. Thus, to unlock the mated connector 12 from the adapter 14, it is necessary to move the lock 50 from the locking position to the unlocking position.

Referring to FIGS. 23A-23B, to extract the connector 12 from the adapter 14, the user grips the extractor 60 and pulls backward. This displaces the extractor 60 backward in relation to the connector housing 22 and drives lock 50 backward. In detail, the engagement surfaces 65 press backward on the fingers 52 of the lock 50, causing the lock 50 to move backward to the unlocking position. This position releases the expandable outer portion 80. This clears enough space so that the flexible wall tabs 92 of the adapter can expand outward to unlatch from the latch knobs 44.

Figure 24B:
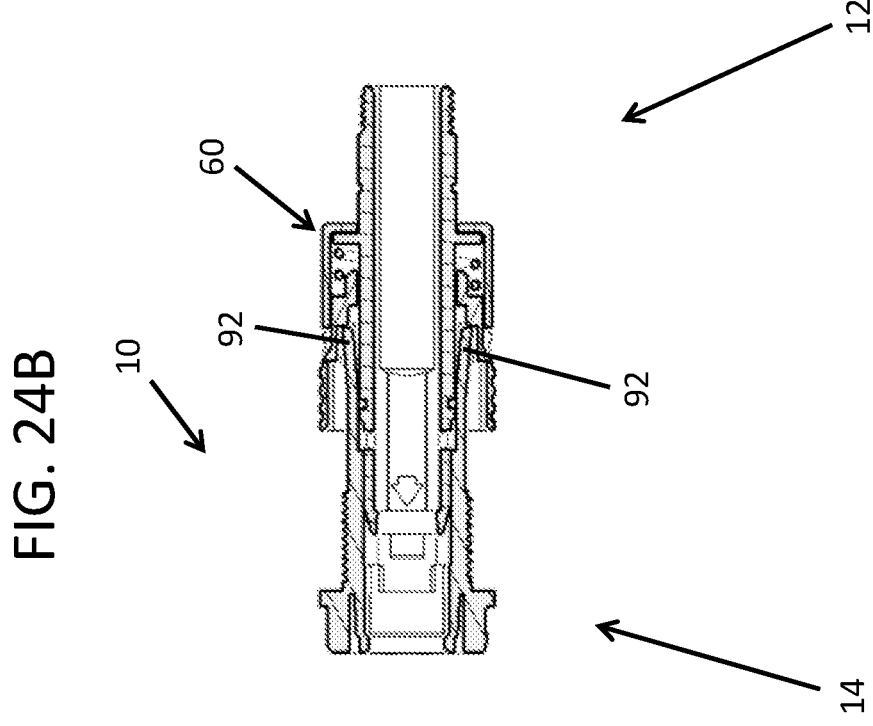
FIG. 24B is a cross section of the connection system in the configuration of FIG. 24A in the cross section plane of FIG. 15B.
Figure 24A:
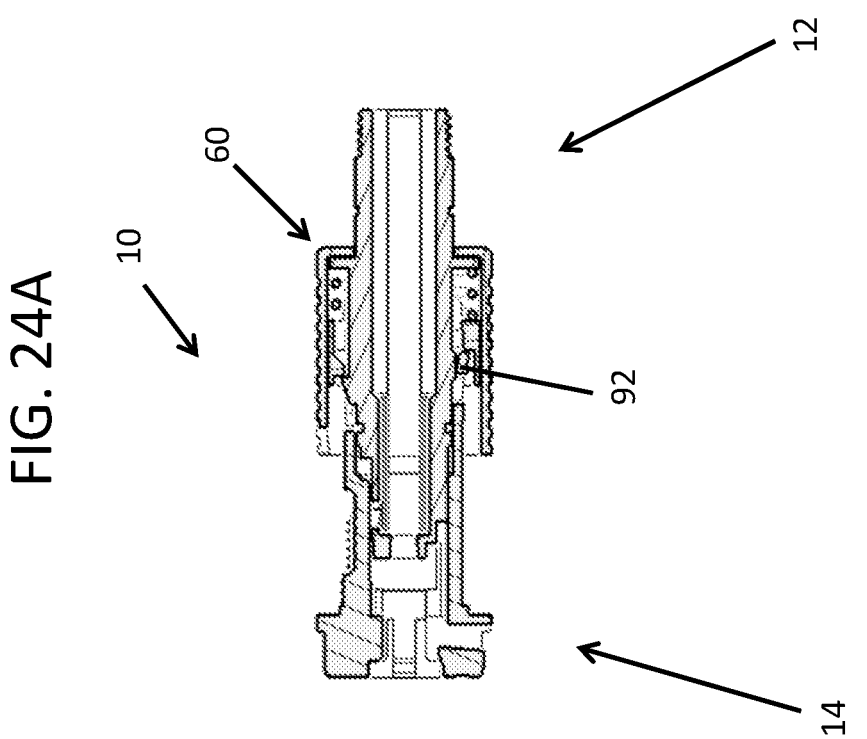
FIG. 24A is another cross section of the connection system as the connector is being further withdrawn from the adapter in the same cross section plane as FIG. 15A.

As shown in FIGS. 24A-24B, the extractor 60 is pulled with sufficient force to expand the flexible wall tabs 92 outward to unlatch the latch recesses from the latch knobs.

Figures 25A, 25B:
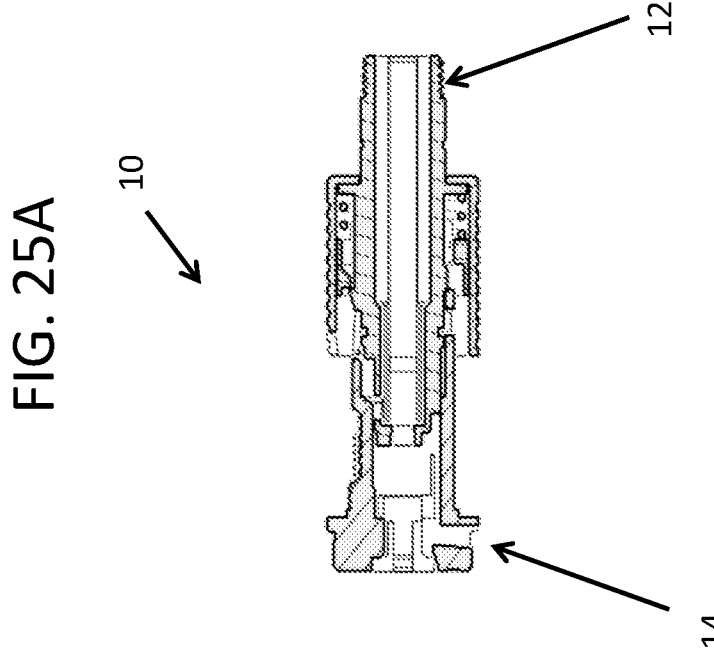
FIG. 25A is another cross section of the connection system as the connector is being further withdrawn from the adapter in the same cross section plane as FIG. 15A.
FIG. 25B is a cross section of the connection system in the configuration of FIG. 25A in the cross section plane of FIG. 15B.
Figure 26:
FIG. 26 is a perspective similar to FIG. 1 of another embodiment of a connection system wherein a connector is mated to an adapter.
Figure 26:
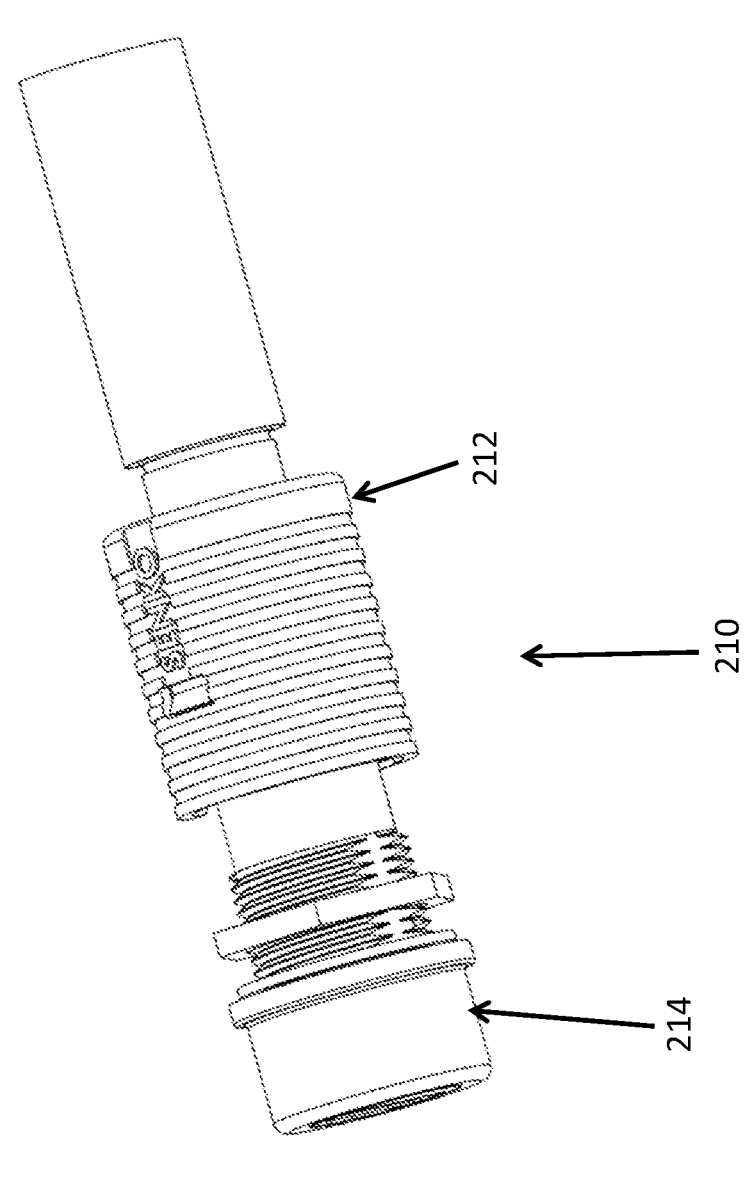
Figure 27:
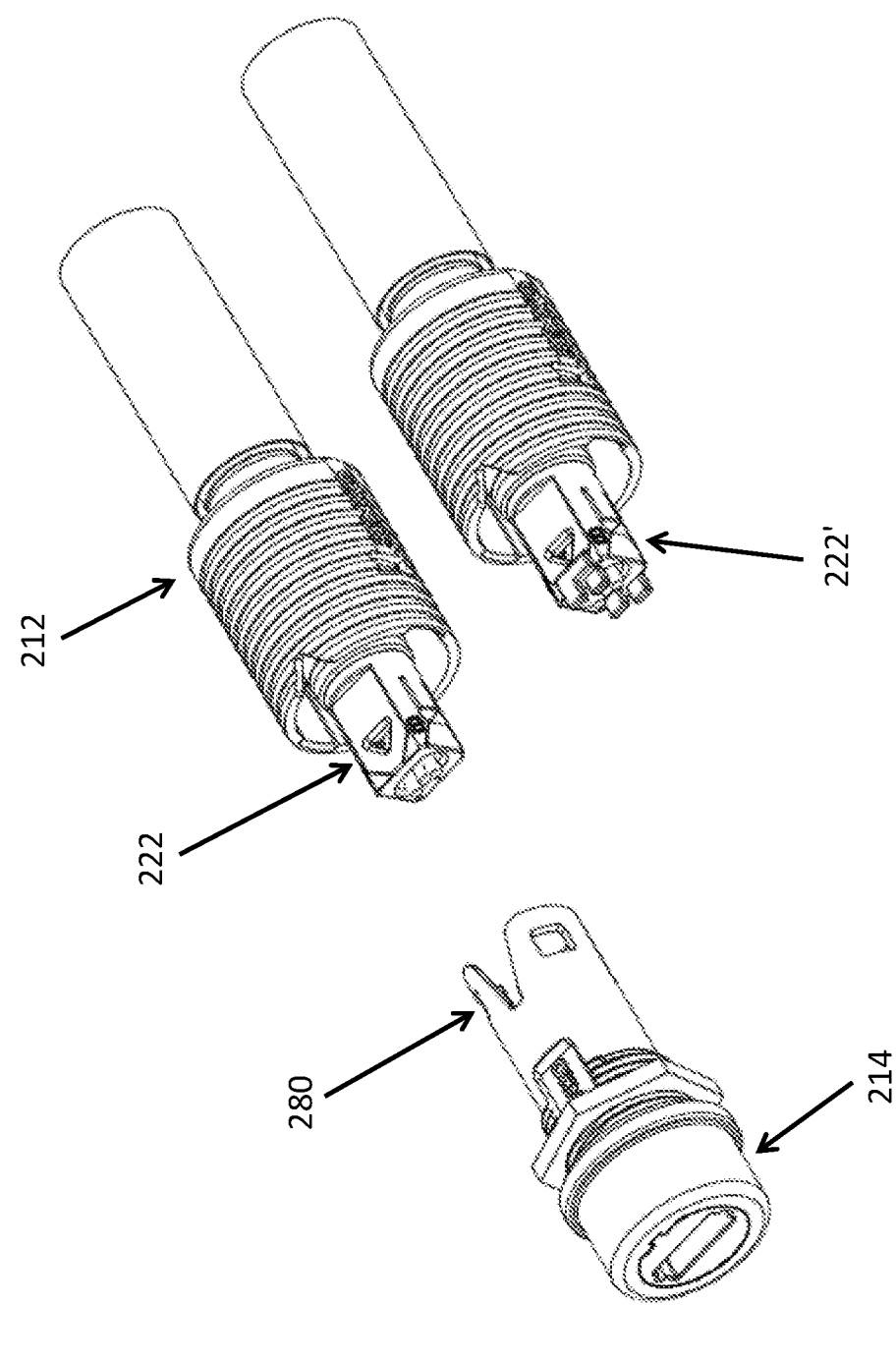
FIG. 27 is a perspective of the connection system of FIG. 26 wherein the connector is unmated from the adapter and a modified version of the connector comprising a connector housing with ferrule protection wings is shown side-by-side with the connector of FIG. 26.
Figure 28:
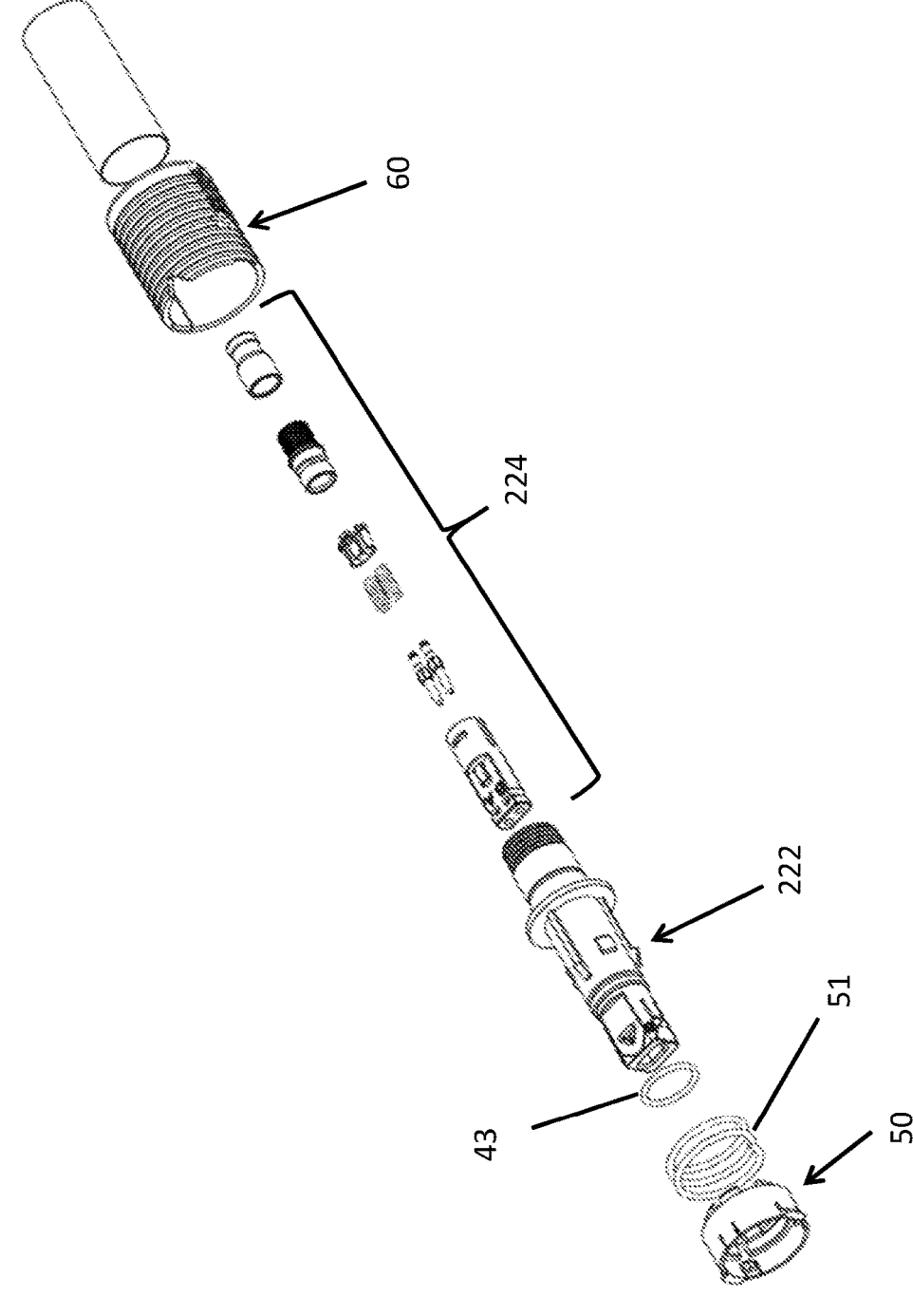
FIG. 28 is an exploded perspective of the connector of FIG. 26.
Figure 29:
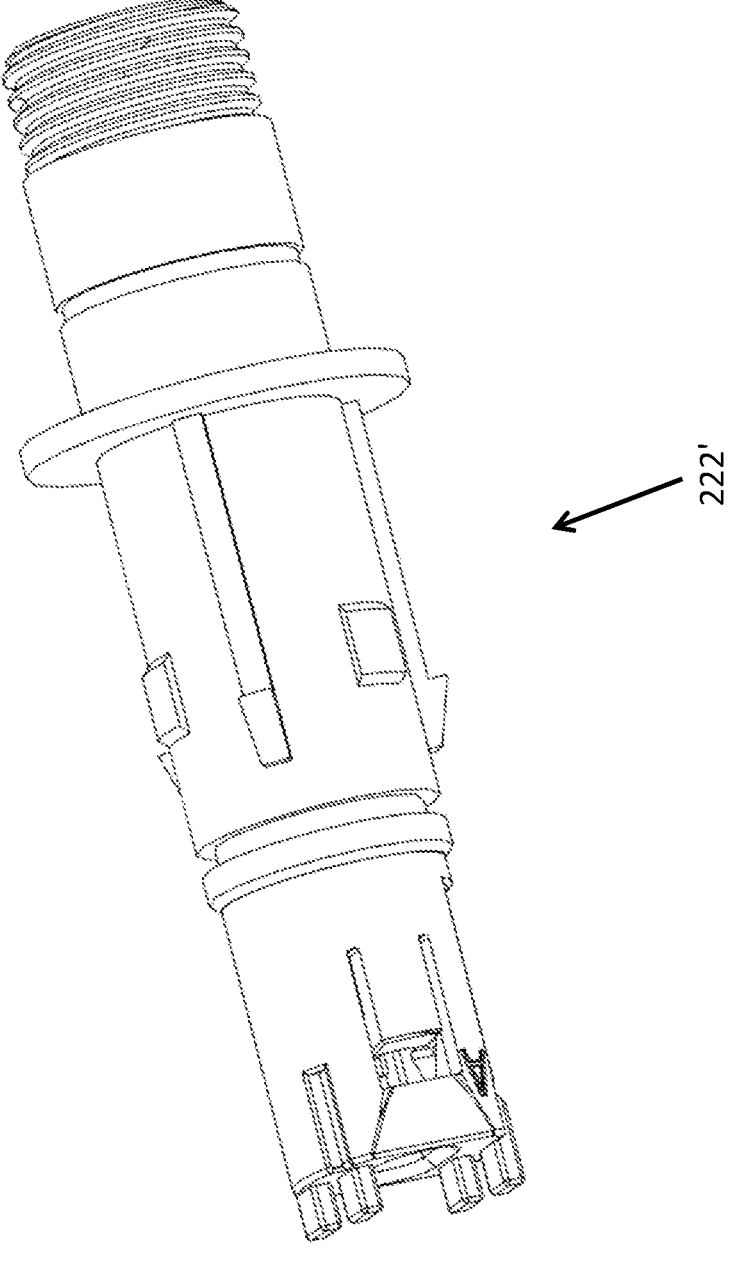
FIG. 29 is a perspective of the housing of the modified version of the connector shown in FIG. 27.
Figure 30:
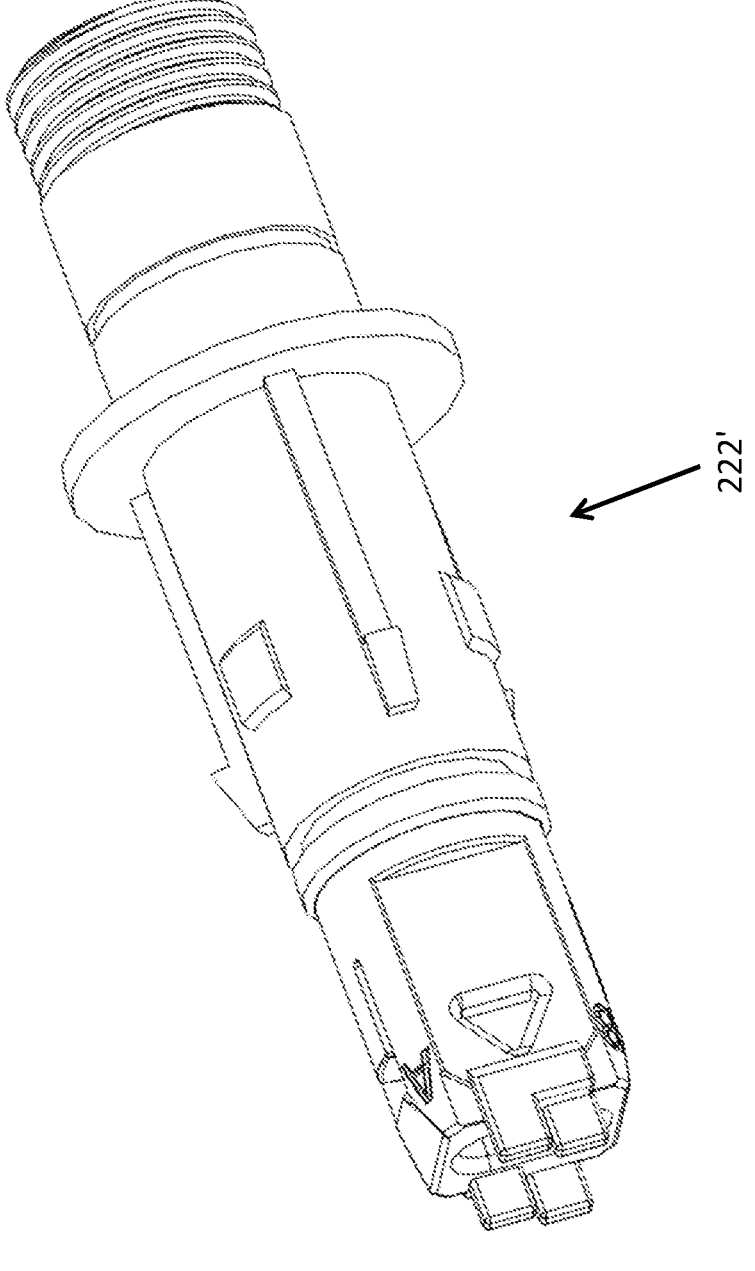
FIG. 30 is another perspective of the connector housing of FIG. 29.
Figure 31:
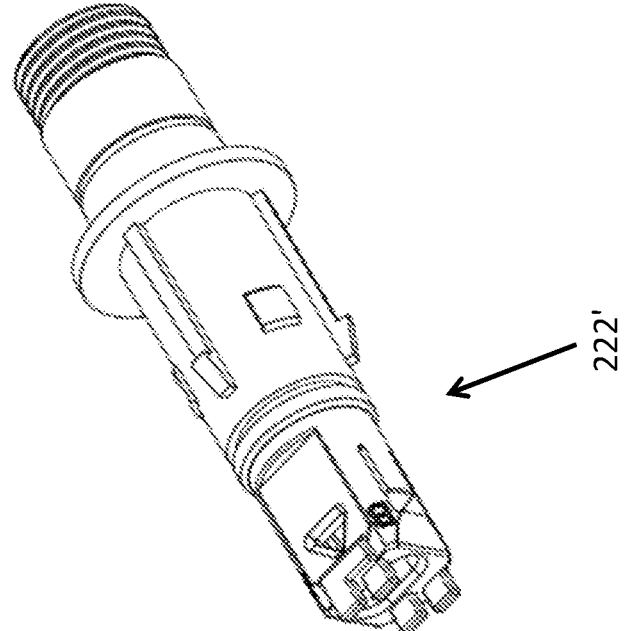
FIG. 31 is another perspective of the connector housing of FIG. 29.
Figure 32:
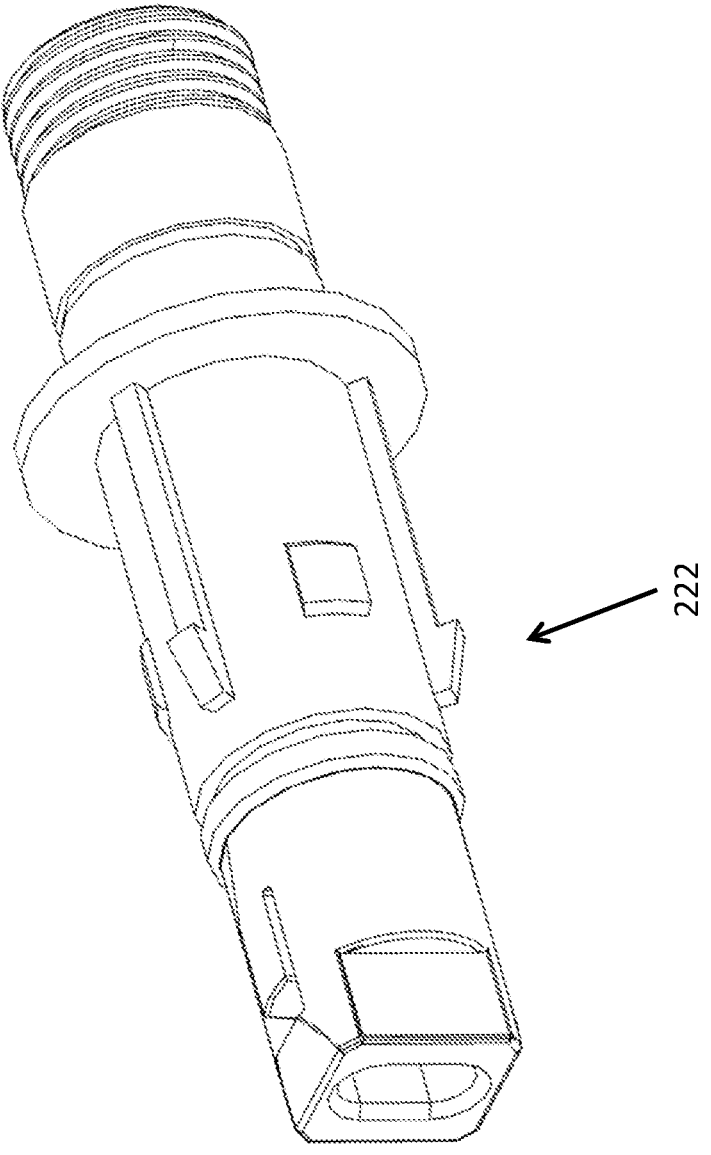
FIG. 32 is a perspective of the connector housing of the version of the connector without ferrule protection wings shown in FIG. 27.
Figure 33:
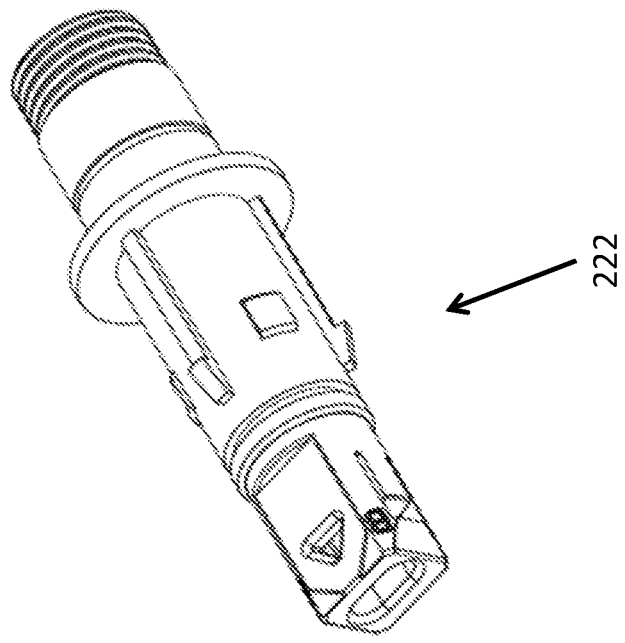
FIG. 33 is another perspective of the connector housing of FIG. 32.
Figure 34:
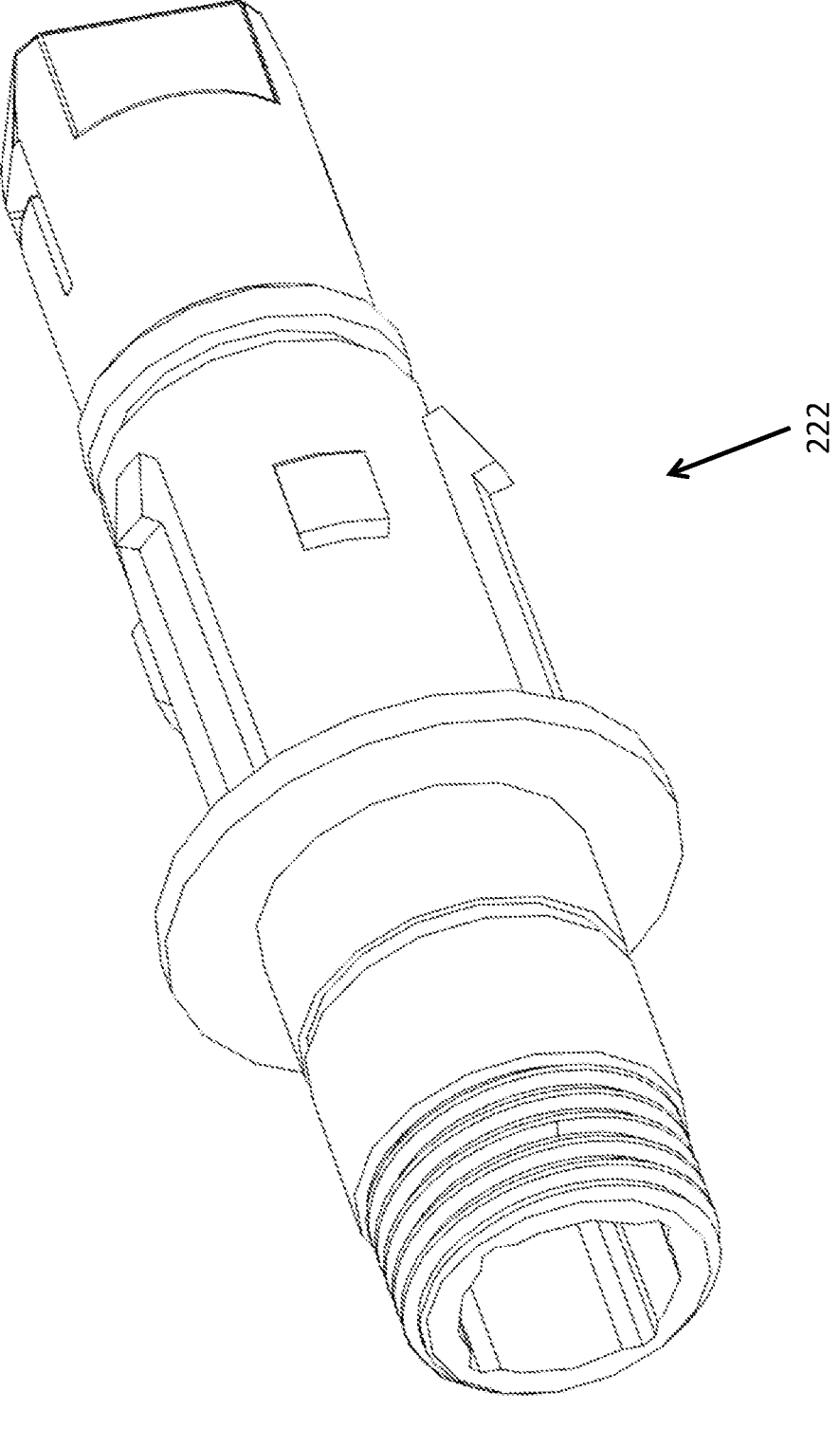
FIG. 34 is another perspective of the connector housing of FIG. 32.
Figure 35:
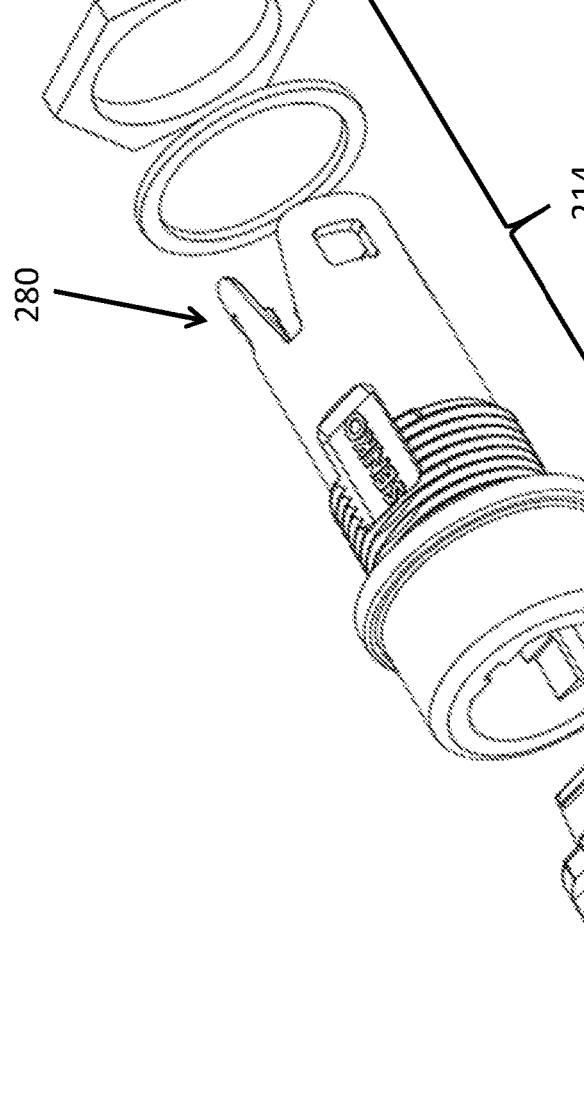
FIG. 35 is an exploded perspective of the adapter of the connection system of FIG. 26.
Figure 36:
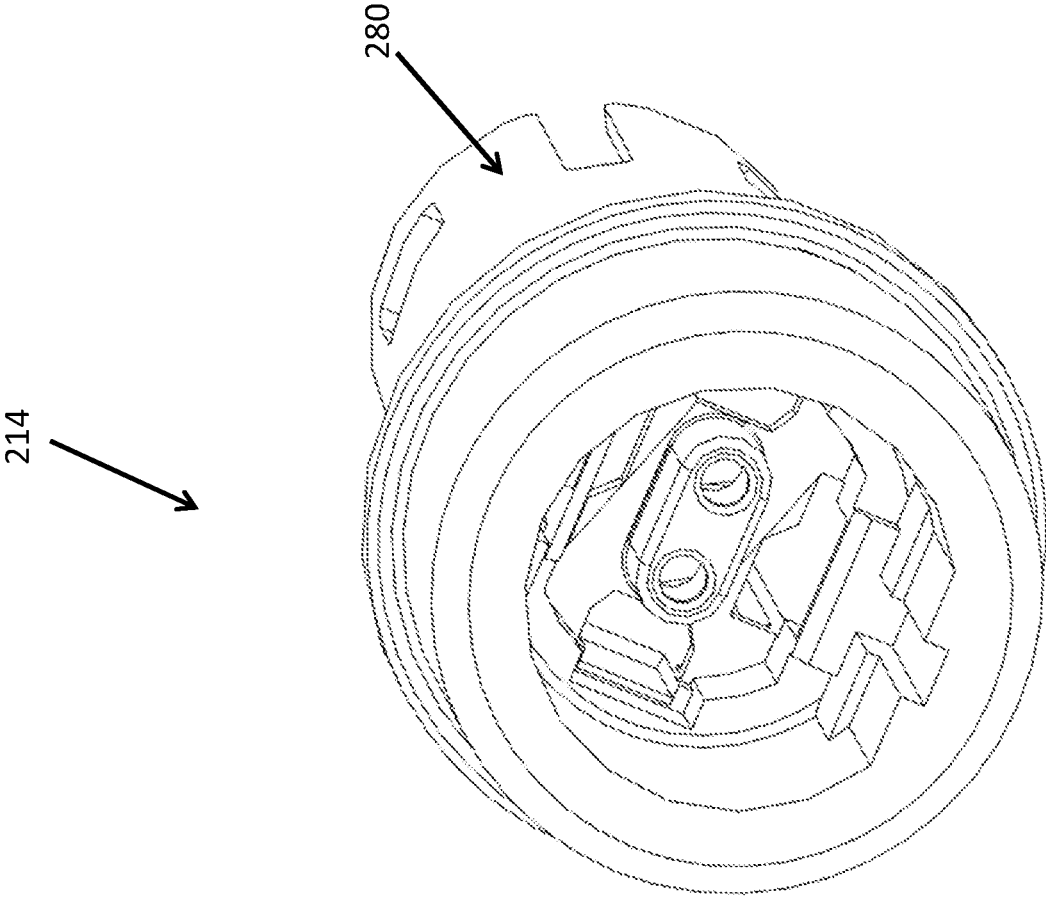
FIG. 36 is a perspective of the adapter of FIG. 35.
Figure 37:
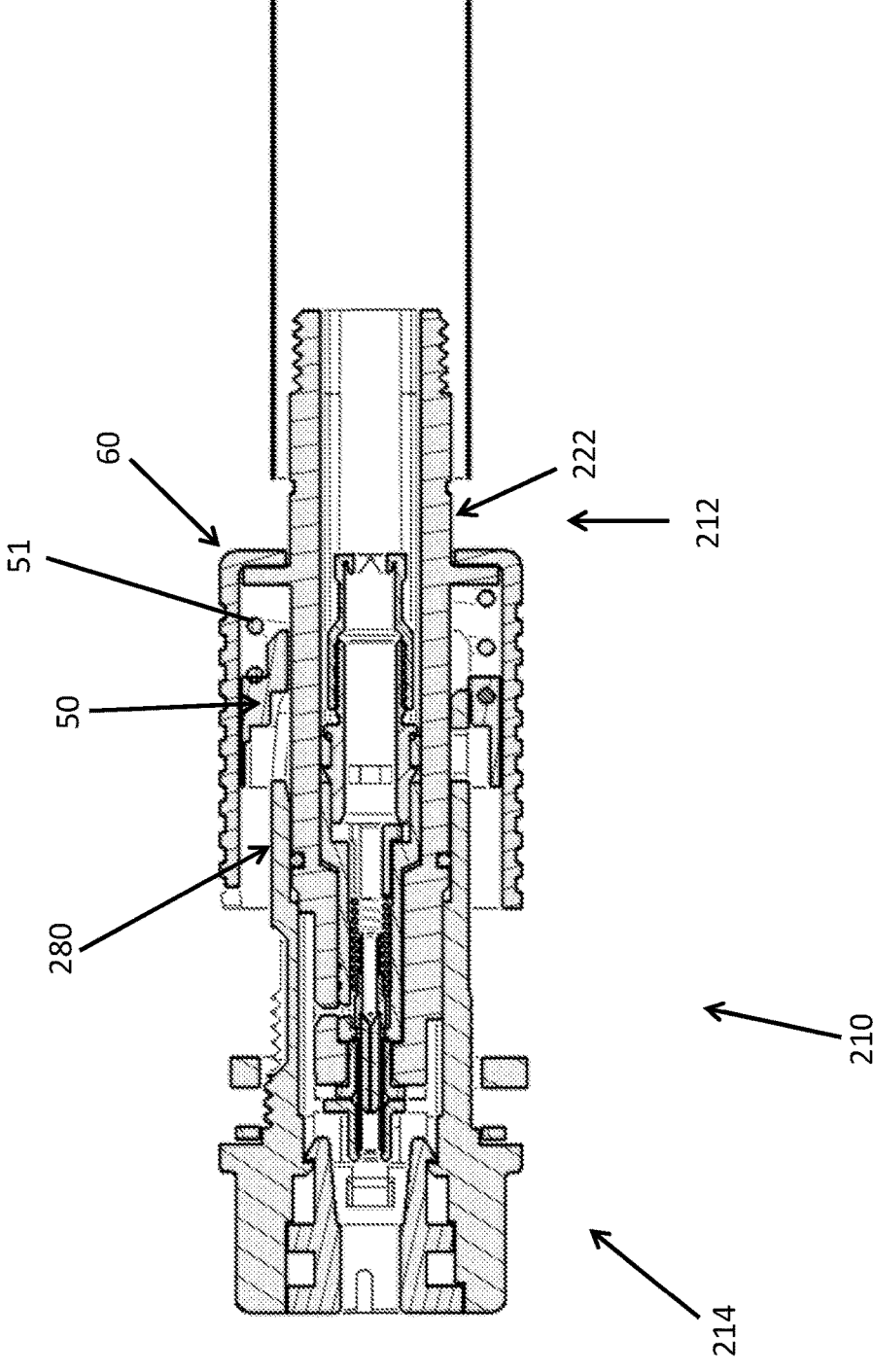
FIG. 37 is a cross section of the connection system in the configuration shown in FIG. 26.
Figure 38:
FIG. 38 is a perspective of another embodiment of a connection system wherein a fiber optic adapter is mated with a fiber optic connector.
Figure 38:
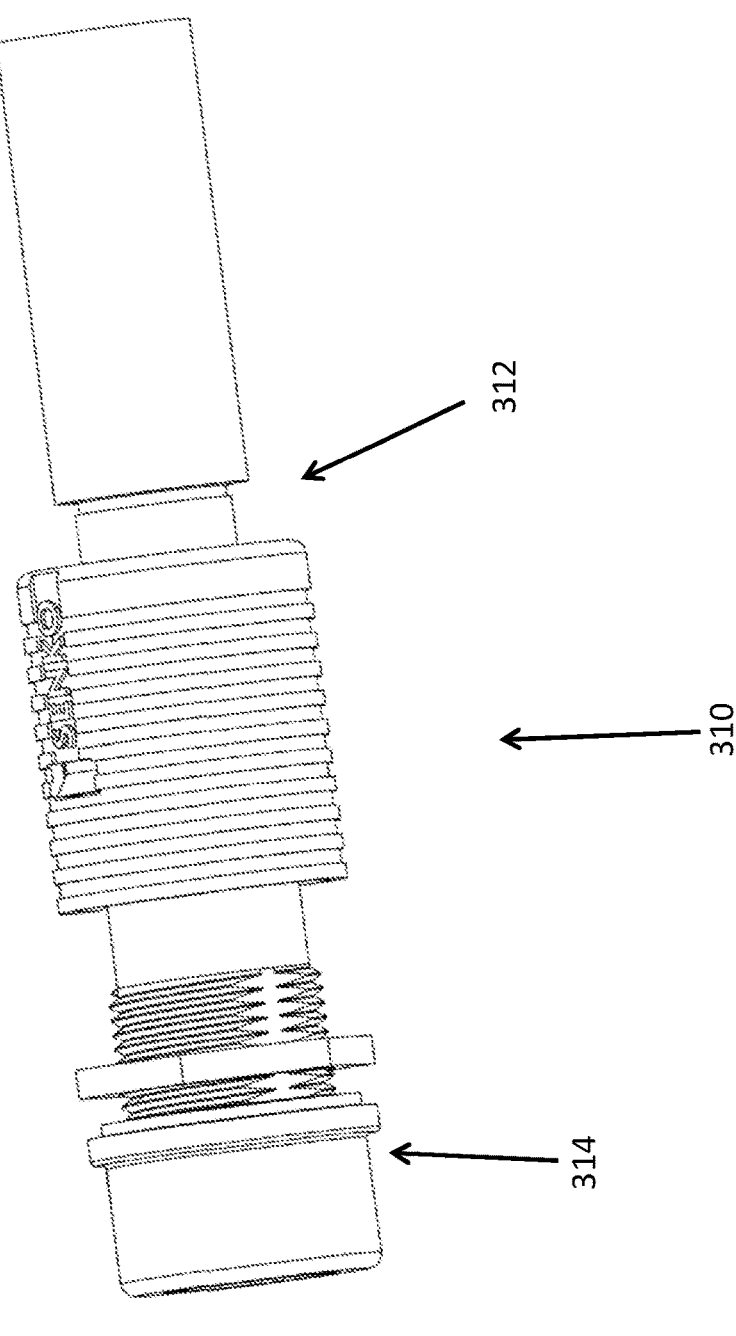
Figure 39:
FIG. 39 is an exploded perspective of the connector of the connection system of FIG. 38.
Figure 39:
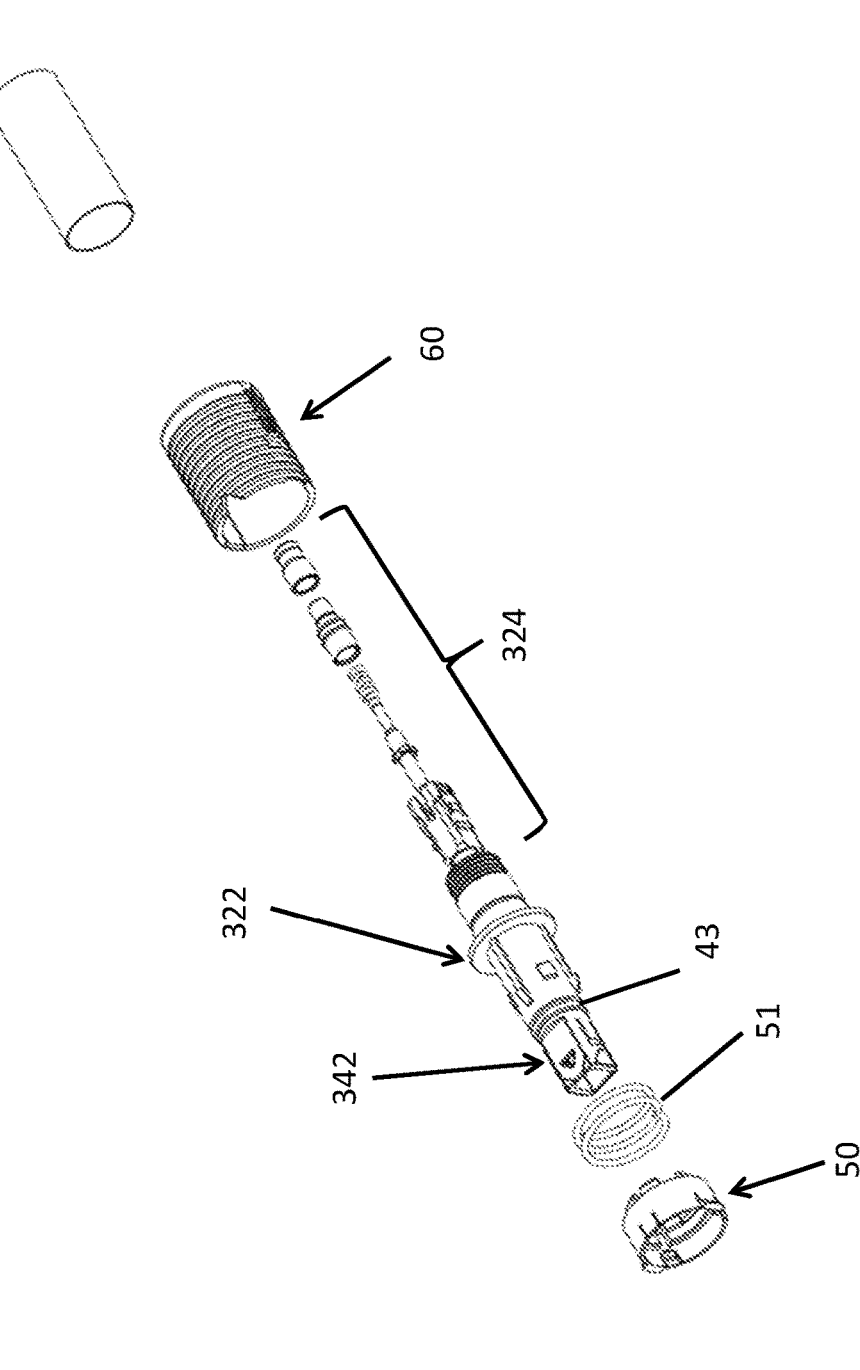
Figure 40:
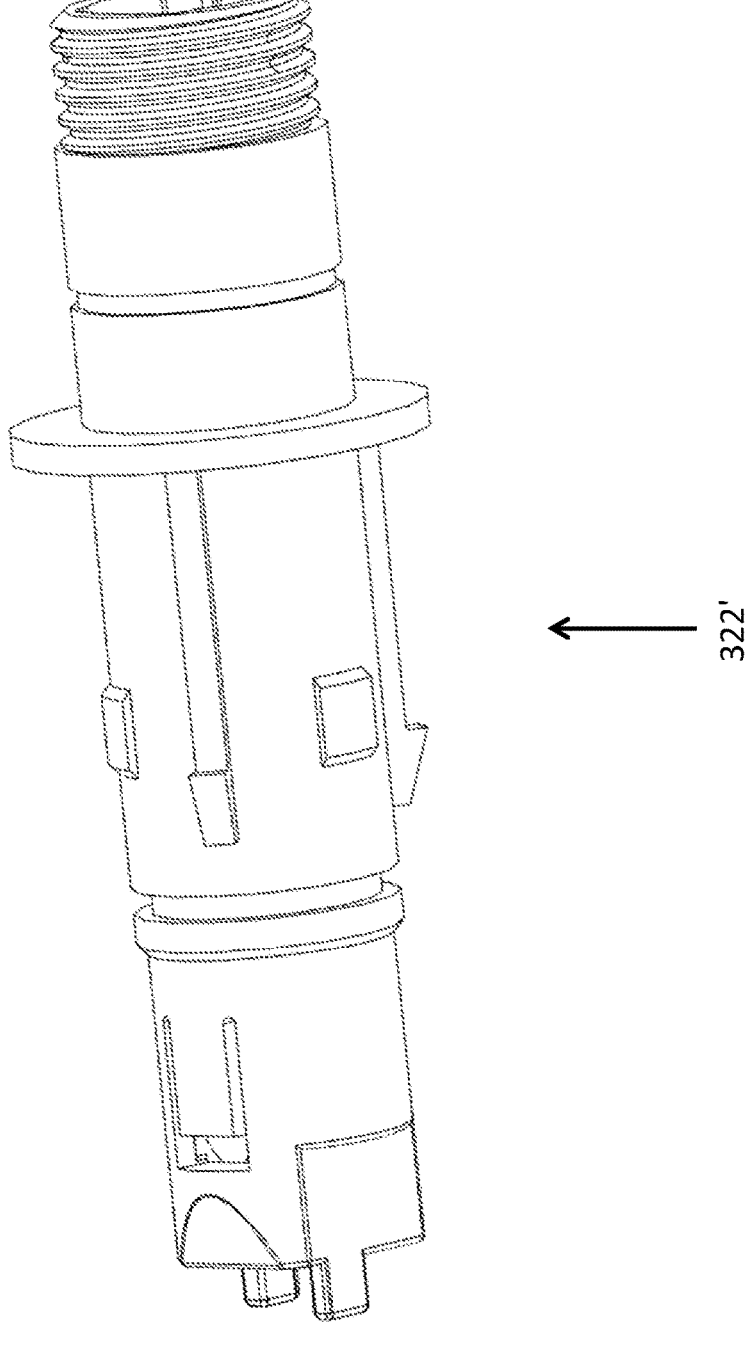
FIG. 40 is a perspective of a connector housing of a modified version of the connector of FIG. 39 wherein the connector comprises ferrule protection wings.
Figure 41:
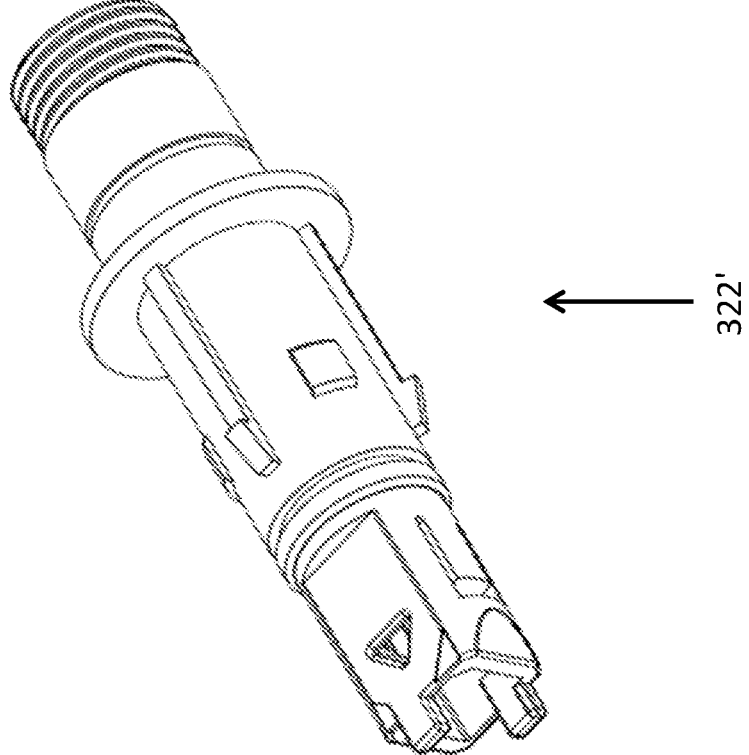
FIG. 41 is another perspective of the connector housing of FIG. 40.
Figure 42:
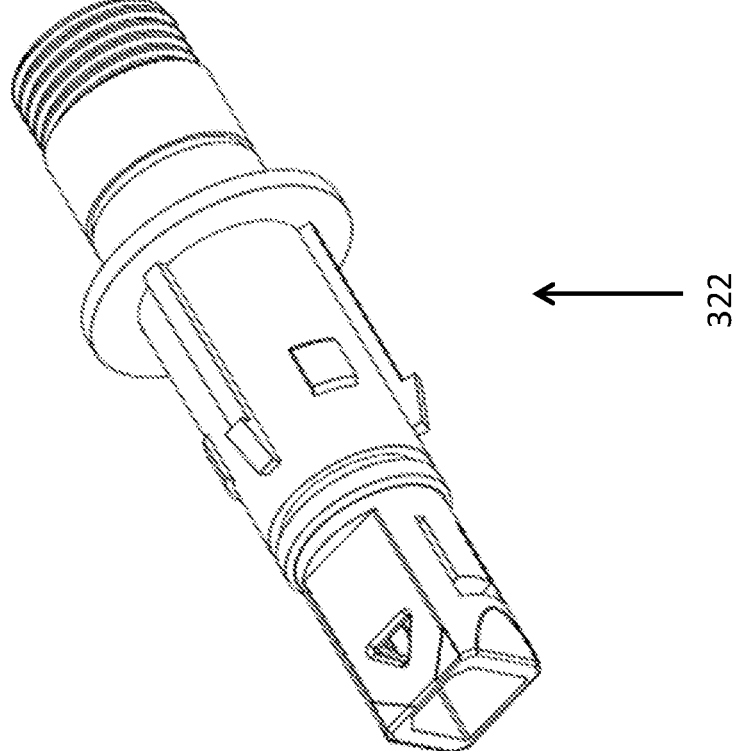
FIG. 42 is a perspective of the connector housing of FIG. 39.
Figure 43:
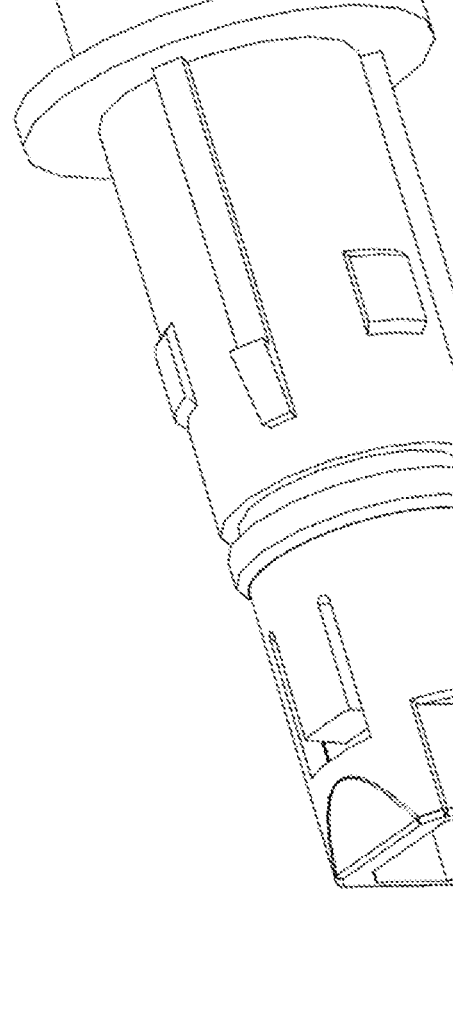
FIG. 43 is another perspective of the connector housing of FIG. 42.
Figure 44:
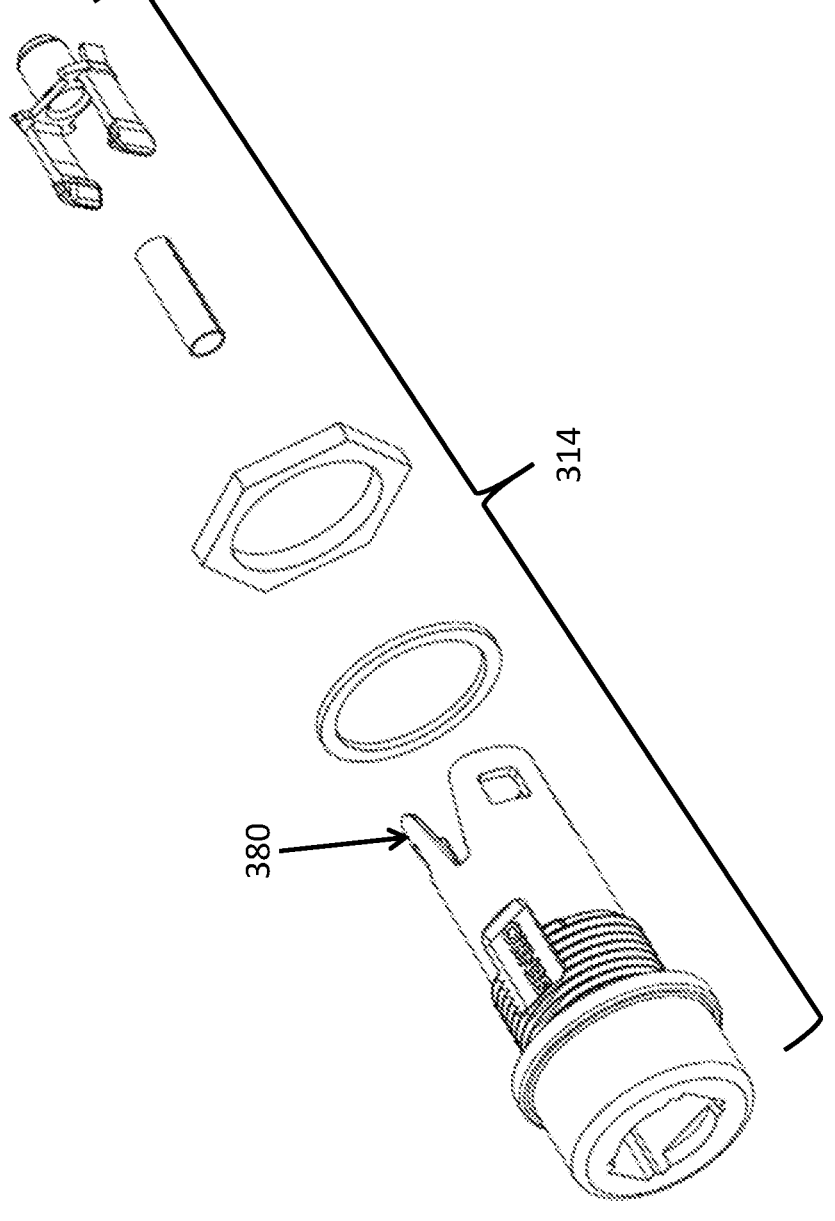
FIG. 44 is an exploded perspective of the adapter of the connection system of FIG. 38.
Figure 45:
FIG. 45 is a perspective of the adapter of FIG. 44.
Figure 45:
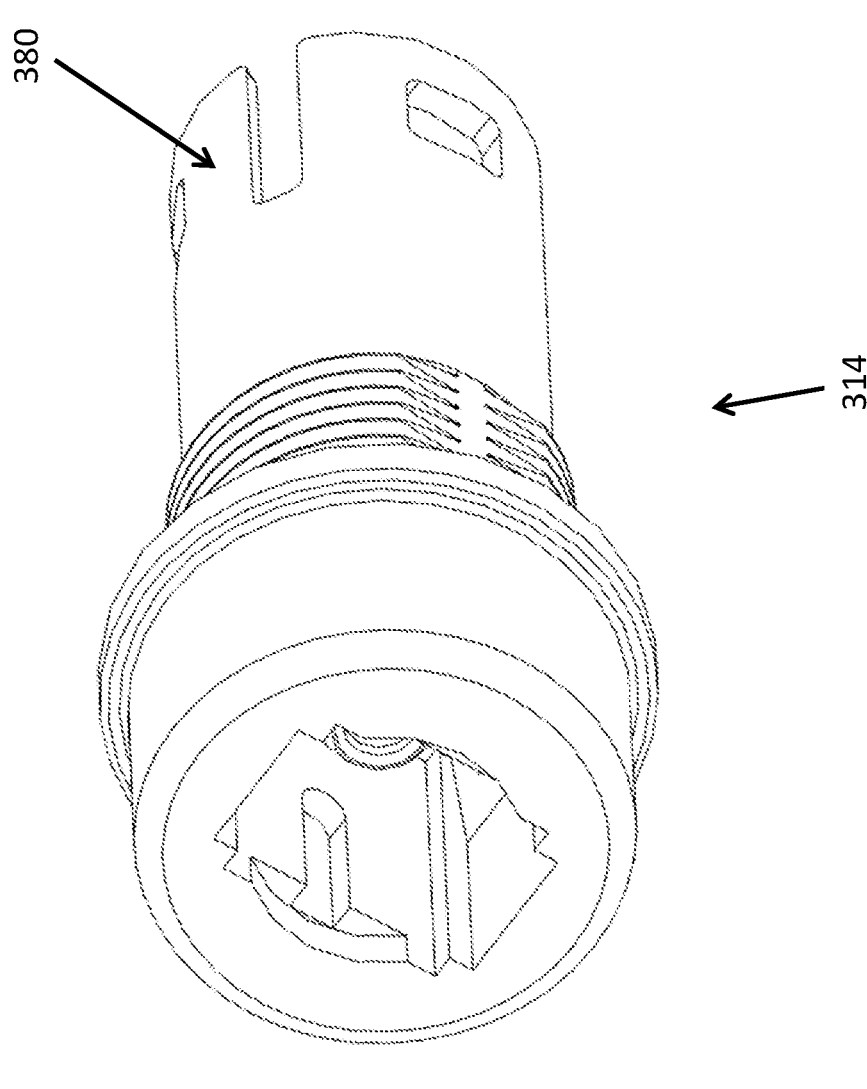
Figure 46:
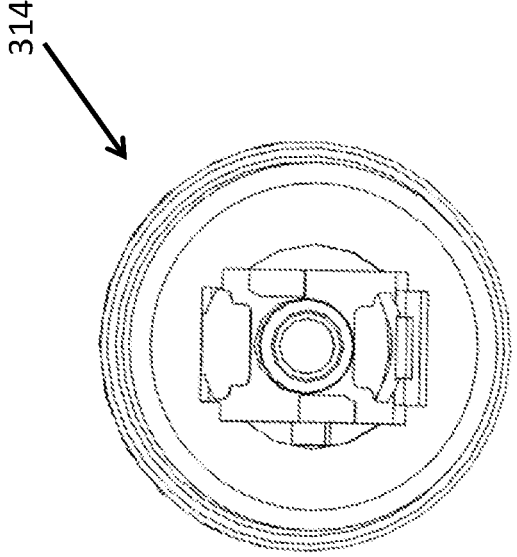
FIG. 46 is another perspective of the adapter of FIG. 44.
Figure 47:
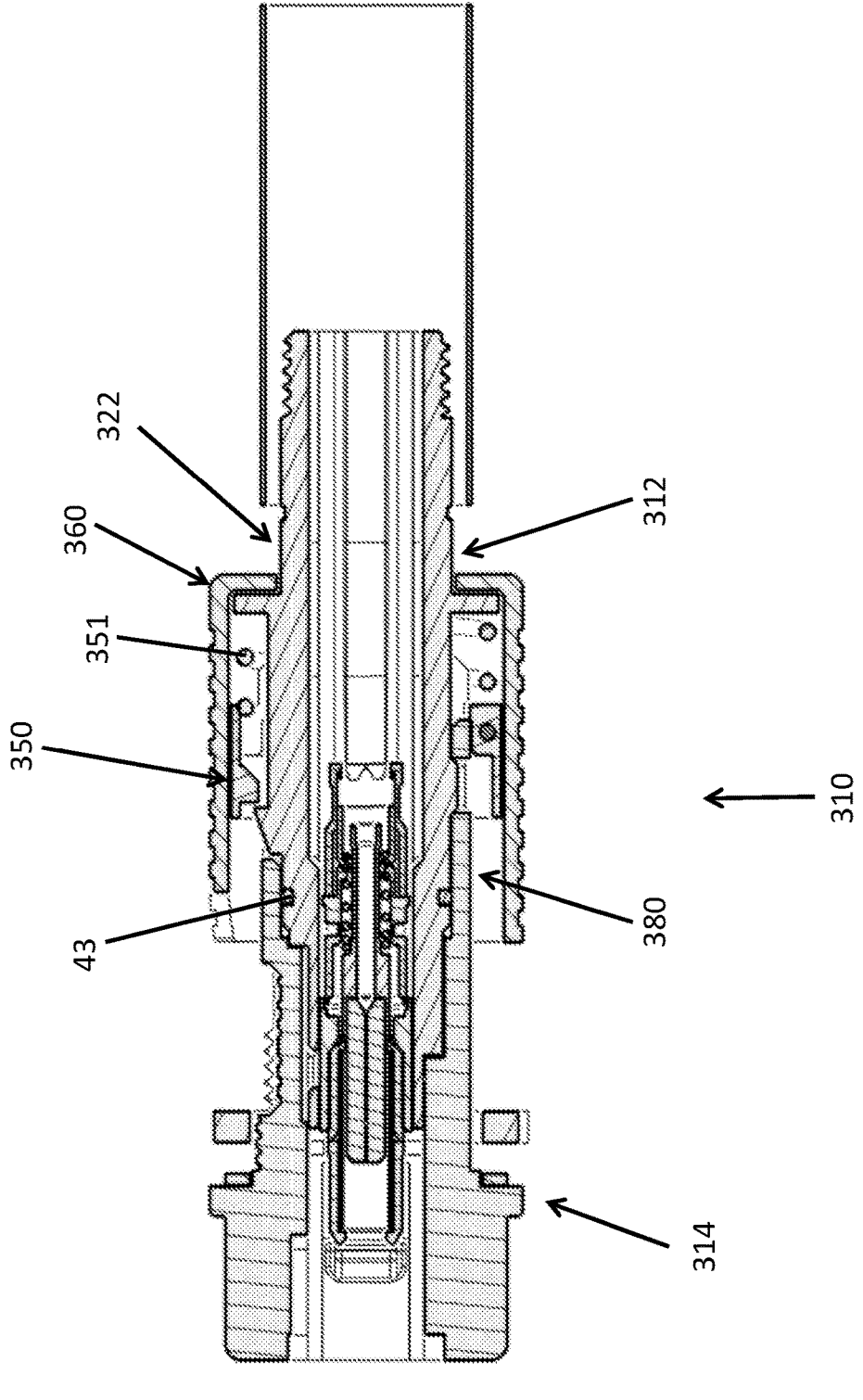
FIG. 47 is a cross section of the connection system of FIG. 38.

This unlatches the connector 12 from the adapter 14 so that the connector can be extracted as shown in FIGS. 25A and 25B.

It can now be seen that the connection system 10 provides a robust, ingress-protected fiber optic interconnect that allows a securely locked connection to be made with a simple push-on operation and allows for selective unlocking and extraction with a simple pull-off operation. No rotating parts are required to lock the connector to the adapter or unlock the connector from the adapter.

Referring to FIGS. 26-47, it will be apparent that the principles of this disclosure can be applied to other types of ingress protected connectors and adapter. As mentioned above, the connector 12 comprises a housing 22 with an MPO-style front portion 42 for mating with an MPO-configured adapter 14 to make an optical connection to a standard MPO connector (not shown). FIGS. 26-37 depict an alternative embodiment of a connection system 210 comprising a connector 212 having a connector housing 222 with a two-ferrule SN-style front portion 242 for mating with a SN-configured adapter 214 to make an optical connection to a standard SN connector. The connector 212 further differs from the connector 12 in that it uses an SN-style inner connector assembly 224 instead of the MPO-style assembly 24. In the connection system 210, the adapter 214 has the same expandable outer portion 280 as the expandable outer portion 80 of the adapter 14 and the connector housing 222 has the same latching portion features as the latching portion 42 of the connector housing 22 so that the connector 212 can use the same gasket 43, lock 50, spring 51, and extractor 60 as the connector 12. Like the MPO-style connector housing 22', the SN-style connector housing 222' can optionally be equipped with one or more ferrule protection wings (see FIGS. 29-31).

FIGS. 38-47 depict another alternative embodiment of a connection system 310 comprising a connector 312 having a connector housing 322 with a single-fiber SC-style front portion 342 for mating with a SC-configured adapter 314 to make an optical connection to a standard SC connector (not shown). The connector 312 further differs from the connector 12 in that it uses an SC-style inner connector assembly 324 instead of the MPO-style assembly 24. In the connection system 310, the adapter 314 has the same expandable outer portion 380 as the expandable outer portion 80 of the adapter 14 and the connector housing 322 has the same latching portion features as the latching portion 42 of the connector housing 22 so that the connector 312 can use the same gasket 43, lock 50, spring 51, and extractor 60 as the connector 12. Like the MPO-style connector housing 22', the SC-style connector housing 322' can optionally be equipped with one or more ferrule protection wings (see FIGS. 40-41).

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A fiber optic connector comprising:
at least one fiber optic ferrule;
a connector housing holding the at least one fiber optic ferrule, the connector housing comprising a latch knob, the fiber optic connector configured to be inserted into an adapter whereby the fiber optic connector is configured to cause the adapter to snap onto the latch knob;
a lock disposed on the connector housing, the lock being movable in relation to the connector housing between a locking position and an unlocking position, the lock in the locking position being configured to lock the connector to the adapter, the lock in the unlocking position being configured to unlock the connector from the adapter, the lock being configured to be moved toward the unlocking position as the fiber optic connector is being inserted into the adapter, the lock being configured to return to the locking position when the adapter snaps onto the latch knob; and
an extractor disposed on the connector housing, the extractor being movable in relation to the connector housing between a forward position and a backward position, the extractor in the forward position configured such that the lock is movable in relation to the extractor to the unlocking position, the extractor configured to be pulled from the forward position to the backward position to move the lock from the locked position to the unlocking position and thereby unlock the connector from the adapter and unlatch the adapter from the latch knob for extraction of the connector from the adapter.

2. The fiber optic connector of claim 1, wherein the extractor comprises a slot having a front end and an engagement surface at the front end of the slot, wherein the lock has a finger slidably received in the slot, the slot configured so that the finger slides backward along the slot as the lock moves in relation to the extractor to the unlocking position, the engagement surface configured to engage the finger to move the lock from the locked position to the unlocked position as the pullback extractor is pulled from the forward position to the backward position.

3. The fiber optic connector of claim 1, wherein the connector housing is configured to expand the adapter from a natural size to an expanded size as the fiber optic connector is inserted into the housing and wherein the adapter is configured to resiliently rebound to the natural size to snap onto the latch knob.

4. The fiber optic connector of claim 3, wherein the lock is configured to engage the adapter when the adapter is expanded to the expanded size such that lock is displaced to the unlocking position by the adapter.

5. The fiber optic connector of claim 1, further comprising a lock spring arranged between the lock and the connector housing.

6. The fiber optic connector of claim 5, wherein the connector housing comprises a lock spring flange and a lock hook.

7. The fiber optic connector of claim 6, wherein the lock comprises a housing hook, wherein the lock hook and the housing hook are configured so that the lock is loadable backward onto the housing whereby the lock hook and housing hook snap into latched relationship with one another such that housing hook is configured to engage the lock hook to stop forward movement of the lock in relation to the connector housing.

8. The fiber optic connector of claim 6, wherein the connector housing comprises a first tongue and groove feature extending lengthwise between the lock spring flange and the lock hook and wherein the lock comprises a second tongue and groove feature slidably coupled to the first tongue and groove feature such that the lock can slide lengthwise in relation to the connector housing and is restrained from rotating relative to the connector housing.

9. The fiber optic connector of claim 1, wherein the latch knob comprises a plurality of latch knobs circumferentially spaced apart about the connector housing.

10. The fiber optic connector of claim 9, wherein the plurality of latch knobs comprises at least three latch knobs.

11. The fiber optic connector of claim 1, further comprising an annular gasket disposed on the connector housing for making an ingress protection seal with the adapter.

12. A fiber optic connection system comprising the fiber optic connector of claim 1 and an adapter for mating with the fiber optic connector.

13. The fiber optic connection system of claim 12, wherein the adapter comprises wall surrounding a port, the wall comprising an expandable outer portion, the expandable outer portion including a latch recess for latching with the latch knob.

14. The fiber optic connection system of claim 13, wherein the expandable outer portion of the wall comprises an expansion slot and a flexible wall tab on each side of the expansion slot, the connector housing configured to bend the flexible wall tabs outward as the connector housing is being inserted into the port, the flexible wall tabs configured to resiliently rebound when the connector housing is inserted to the latch position whereby the latch recess latches with the latch knob.

15. A fiber optic connector comprising:
at least one fiber optic ferrule;
a connector housing holding the at least one fiber optic ferrule, the connector housing comprising a latch knob, the fiber optic connector configured to be inserted into an adapter whereby the fiber optic connector is configured to cause the adapter to snap onto the latch knob; and
a lock disposed on the connector housing, the lock being movable in relation to the connector housing between a locking position and an unlocking position, the lock in the locking position being configured to lock the connector to the adapter, the lock in the unlocking position being configured to unlock the connector from the adapter, the lock being configured to be moved toward the unlocking position as the fiber optic connector is being inserted into the adapter, the lock being configured to return to the locking position when the adapter snaps onto the latch knob,
wherein the connector housing comprises a lock spring flange and a lock hook.

16. The fiber optic connector of claim 15, wherein the lock comprises a housing hook, wherein the lock hook and the housing hook are configured so that the lock is loadable backward onto the housing whereby the lock hook and housing hook snap into latched relationship with one another such that housing hook is configured to engage the lock hook to stop forward movement of the lock in relation to the connector housing.

17. The fiber optic connector of claim 15, wherein the connector housing comprises a first tongue and groove feature extending lengthwise between the lock spring flange and the lock hook and wherein the lock comprises a second tongue and groove feature slidably coupled to the first tongue and groove feature such that the lock can slide lengthwise in relation to the connector housing and is restrained from rotating relative to the connector housing.

*  *  *  *  *